United States Patent
Noguchi et al.

(10) Patent No.: US 6,761,431 B2
(45) Date of Patent: Jul. 13, 2004

(54) POLYMER FILM, POLYMERIC COMPOUND FOR FORMING THE SAME, METHOD OF MANUFACTURING SUCH POLYMERIC COMPOUND, LIQUID-REPELLENCY TREATMENT SOLUTION USING SUCH POLYMERIC COMPOUND, SURFACE-MODIFYING METHOD USING SUCH TREATMENT SOLUTION AND SURFACE-MODIFIED ARTICLE

(75) Inventors: Hiromichi Noguchi, Tokyo (JP); Ken Ikegame, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 09/734,199

(22) Filed: Dec. 12, 2000

(65) Prior Publication Data

US 2001/0017639 A1 Aug. 30, 2001

(30) Foreign Application Priority Data

Dec. 13, 1999 (JP) .......................... 11-353719
Dec. 13, 1999 (JP) .......................... 11-353755

(51) Int. Cl.$^7$ .......................... B41J 2/135; C23F 1/00
(52) U.S. Cl. .......................... 347/45; 216/94
(58) Field of Search .......................... 347/45, 47, 101; 526/292; 525/276; 216/27, 85, 94

(56) References Cited

U.S. PATENT DOCUMENTS

| | | | |
|---|---|---|---|
| 4,316,941 A | 2/1982 | Eguchi et al. ............... | 428/421 |
| 4,368,296 A | 1/1983 | Kuhls et al. ................ | 525/276 |
| 4,408,007 A | 10/1983 | Kuhls et al. ................ | 524/546 |
| 4,590,236 A | 5/1986 | König et al. ................ | 524/460 |
| 4,933,408 A | 6/1990 | Goldenberg ................ | 526/247 |
| 4,997,873 A | 3/1991 | Süling et al. ............... | 524/458 |
| 5,043,747 A | 8/1991 | Ebisawa et al. ........ | 346/140 R |
| 5,075,106 A | 12/1991 | Goldenberg ................ | 526/247 |
| 5,231,141 A | 7/1993 | Arai et al. .................. | 525/286 |
| 5,349,003 A | 9/1994 | Kato et al. .................. | 524/458 |
| 5,582,879 A | 12/1996 | Fujimura et al. ........... | 427/561 |
| 5,798,406 A | 8/1998 | Feret et al. ................. | 524/501 |
| 5,880,204 A | 3/1999 | McCarthy et al. .......... | 524/520 |
| 6,080,326 A | 6/2000 | Matsuhisa et al. ......... | 252/8.62 |
| 6,140,408 A | 10/2000 | McCarthy et al. .......... | 524/506 |

FOREIGN PATENT DOCUMENTS

| | | |
|---|---|---|
| EP | 0 428 133 A3 | 5/1991 |
| EP | 0 672 691 A1 | 9/1995 |

(List continued on next page.)

OTHER PUBLICATIONS

Patent Abstracts of Japan, vol. 1996, No. 09, with respect to JP 08–132614 of May 28, 1996.
Patent Abstracts of Japan, vol. 1995, No. 08, with respect to JP 07–138744 A of May 30, 1995.

*Primary Examiner*—Lamson Nguyen
(74) *Attorney, Agent, or Firm*—Fitzpatrick, Cella, Harper & Scinto

(57) ABSTRACT

A novel polymer film is based on a principle totally different from that of the known liquid-repelling agents used with the known surface-modifying methods and can easily modify the properties of the surface of an article. More specifically, such a polymer film can be formed on the surface of an article by application to improve the liquid repellency of the surface of the article and maintain the liquid-repelling effect. A novel polymeric compound can be used to form such a polymer film and a liquid-repellency treatment solution containing such a polymeric compound. There is also provided a method of modifying the surface of an article by means of such a liquid-repellency treatment solution and articles having a modified surface. The polymer film contains fluorine atoms and has physical aggregates of polymer chains in the inside and/or on the surface.

13 Claims, 6 Drawing Sheets

FOREIGN PATENT DOCUMENTS

| | | |
|---|---|---|
| EP | 0 708 120 A1 | 4/1996 |
| EP | 0 779 337 A1 | 6/1997 |
| EP | 0 942 024 A2 | 9/1999 |
| EP | 0 942 025 A2 | 9/1999 |
| EP | 0 942 026 A2 | 9/1999 |
| GB | 947578 | 1/1960 |
| JP | 62-277408 | 12/1987 |
| JP | 8-132614 | 5/1996 |
| JP | 10-53639 | 2/1998 |
| WO | WO 97/11979 | 4/1997 |
| WO | WO 97/38032 | 10/1997 |
| WO | WO 99/01505 | 1/1999 |

LIGHT IRRADIATION

POLYMER FILM, POLYMERIC COMPOUND FOR FORMING THE SAME, METHOD OF MANUFACTURING SUCH POLYMERIC COMPOUND, LIQUID-REPELLENCY TREATMENT SOLUTION USING SUCH POLYMERIC COMPOUND, SURFACE-MODIFYING METHOD USING SUCH TREATMENT SOLUTION AND SURFACE-MODIFIED ARTICLE

BACKGROUND OF THE INVENTION

1. Field of the Invention

This invention relates to a polymer film that performs well in terms of stable liquid repellency as well as adhesion to base materials, hardness and abrasion resistance, to a liquid-repellency treatment solution of good film formability highly adapted to forming such high quality film, to a polymeric compound to be used for such a treatment solution and also to a method of manufacturing such a polymeric compound.

The present invention also relates to a surface-modifying method to provide the surface of an article with stable liquid repellency by using a single resin ingredient system, and preferably, to form films that are advantageous in terms of stable liquid repellency as well as adhesion to the base material, hardness and abrasion resistance and also to a surface-modified article.

The present invention additionally relates to an ink-jet recording head for forming an image on a recording medium by ejecting ink droplets highly adapted to form a stably liquid-repellent film (that is, preferably, also highly adherent to the base material, hard and abrasion-resistant), to a method of manufacturing a discharge orifice plate to be used for such an ink-jet recording head and also to an ink-jet recording apparatus. An ink-jet recording head according to the invention can particularly suitably be applied to an ink-jet recording apparatus that uses mechanical energy generated by means of piezoelectric elements or thermal energy obtained by means of an electrothermal converter as energy for ejecting ink droplets and recording dots on the recording medium.

2. Related Background Art

Methods for applying a liquid composition adapted to introduce desired properties onto the surface of a base material are used as an embodiment of the method of modifying the surface of the base material of an article that is devoid of such properties. Articles to the surface of which such a liquid-repelling agent is applied include various goods for daily life, water pipes and so on as well as an ink-jet head of an ink-jet recording apparatus that are adapted to use a liquid-repellent solution for recording images. For instance, as ink accumulates near the discharge orifices on the discharge orifice plane for discharging ink that is arranged on an ink-jet head, there can arise problems including ink slippage along the ink discharge direction on the formed image and clogged discharge orifices. Therefore, it is a general practice to apply a liquid-repelling agent to the discharge orifice plane where the discharge orifices are arranged.

For example, Japanese Patent Application Laid-Open No. 10-053639 describes a fluorine type liquid-repelling agent in a liquid state that is a fluorine-containing epoxy resin composition containing (a) a multifunctional epoxy resin having two or more epoxy groups in a molecule and not containing F nor Si by 5 to 80 parts by weight, (b) an epoxy compound having a perfluoro group at the terminal by 5 to 40 parts by weight and (c) a compound having two or more epoxy groups, two or more alcohol groups, two or more carboxylic acid groups and/or two or more amine groups in a molecule and also containing F or Si by 5 to 80 parts by weight.

Japanese Patent Application Laid-Open No. 08-132614 discloses an electrically insulating resin film formed on the inner wall of the nozzle and the flow path of an ink-jet head that is acryl type electrodeposition resin containing fine particles of a fluorine resin.

However, of the above cited prior art, the electrically insulating resin film disclosed in Japanese Patent Application Laid-Open No. 08-132614 is composed of a film formed simply by adding liquid-repellent fluorine resins to the film in a mixed state. Therefore, the liquid repellency of the film is gradually reduced and the modified surface of the film gradually loses the uniformity of its advantageous properties if the surface of the resin film is held in an abrasive environment.

On the other hand, while ingredients of the fluorine-containing epoxy resin composition described in Japanese Patent Application Laid-Open No. 10-053639 show compatibility in a dissolved state, their distribution can become varied on the applied film depending on the conditions of application to produce a specific distribution pattern of liquid repellency in the applied film. Additionally, the ingredients have to be held in an evenly mixed condition when the composition is in a dissolved state to consequently make it very difficult to control the storage of the solution.

Besides fluorine type liquid-repelling agents in a liquid state, liquid-repelling agents containing silicon are also known. However, silicon is found on the surface of the liquid-repellent film formed by a silicon-containing liquid-repelling agent so that the liquid-repelling effect of the film is reduced if the liquid-repellent film is abraded repeatedly.

SUMMARY OF THE INVENTION

As a result of a series of intensive research efforts looking into the prior art, the inventors of the present invention came to find that the prior art surface-modifying techniques are insufficient for improving the liquid repellency to maintain the liquid-repelling effect of a liquid-repelling agent. Additionally, there is a strong demand not only in the field of ink-jet recording but also in various technological fields for improved surface-modifying methods that can enhance the liquid repellency of the surface to maintain the liquid-repelling effect. For instance, such improved methods will find applications in the field of treating the outer walls of buildings.

Therefore, it is an object of the present invention to provide a novel polymer film that is based on a principle totally different from that of the known liquid-repelling agents used with the known surface-modifying methods and can easily modify the properties of the surface of an article, More specifically, such a polymer film can be formed on the surface of an article by application to improve the liquid repellency of the surface of the article to maintain the liquid-repelling effect.

Another object of the present invention is to provide a liquid-repellency treatment solution containing a novel polymeric compound that can be used for forming a polymer film according to the invention and showing an excellent liquid-repelling effect.

Still another object of the present invention is to provide a method of manufacturing a novel macro-monomer that can be used for synthetically producing a polymeric compound that can by turn be used for forming a polymer film according to the invention and showing an excellent liquid-repelling effect and also a method of manufacturing a graft polymeric compound by using such a novel macromonomer.

Still another object of the present invention is to provide a surface-modifying method adapted to provide the surface of an article with a film coat that operates excellently in terms of liquid repellency and film formability as well as adhesion to articles, hardness and abrasion resistance, and also to provide a surface-modified article.

Still another object of the present invention is to provide a surface-modifying method adapted to form an excellent film coat, which can be processed by using light energy such as an excimer laser.

Still another object of the present invention is to provide an ink-jet recording head having an excellent discharge orifice plane in terms of liquid repellency (and, preferably, adhesion to the base material of the discharge orifice plane as well as hardness and abrasion resistance) prepared by applying a liquid-repelling agent according to the invention, in which the liquid repellency and the like can be maintained without being reduced by use, and also an Ink-jet recording apparatus comprising such an ink-jet recording head.

A further object of the present invention is to provide a method of manufacturing a discharge orifice plate to be used for an ink-jet recording head to easily obtain the latter having a discharge orifice plane provided with a highly liquid-repellent film coat preferably by using light energy such as an excimer laser.

The above objects are achieved by the present invention. In one aspect of the invention, there is provided a polymer film including a polymer chain containing fluorine atom wherein the polymer film has a physical aggregate (domain) of the polymer chain in the inside and/or on the surface thereof.

In another aspect of the invention, there is provided a polymer film composed of a single polymeric compound comprising first segments containing fluorine atoms and second segments different from the first segments in terms of affinity for solvents, including aggregates of the polymeric compound formed in the inside and/or on the surface thereof by physical crosslink between the first segments.

In still another aspect of the invention, there is provided a polymer film composed of a single polymeric compound comprising first segments containing fluorine atoms and second segments different from the first segments in terms of affinity for solvents, including an aggregate of the polymeric compound formed by physical crosslink between the first segments, the second segments being mutually chemically crosslinked.

In still another aspect of the invention, there is provided a liquid-repellency treatment solution dissolving a polymeric compound having a polymer chain containing fluorine atoms, wherein the solution contains a physical aggregate of the polymer chain.

In still another aspect of the invention, there is provided a liquid-repellency treatment solution containing a single polymeric compound, dissolved in a solvent, comprising first segments containing fluorine atoms and second segments different from the first segments in terms of affinity for the solvent; and an aggregate of the polymeric compound formed by physical crosslink between the first segments.

In still another aspect of the invention, there is provided a surface-modified article having liquid repellency, having a polymer film provided on the surface, the polymer film including a polymer chain containing fluorine atoms, and a physical aggregate of the polymer chain in the inside and/or on the surface thereof.

In still another aspect of the invention, there is provided a surface-modified article having liquid repellency, having a polymer film provided on the surface, the polymer film being composed of a single polymeric compound comprising first segments containing fluorine atom and second segments different from the first segment in terms of affinity for solvents, including an aggregate of the polymeric compound in the inside and/or on the surface thereof by physical crosslink between the first segments.

In still another aspect of the invention, there is provided a surface-modifying method comprising the steps of applying to the surface of an article a liquid-repellency treatment solution dissolving a polymeric compound having a polymer chain containing fluorine atom and a physical aggregate of the polymer chain; and drying the solution.

In still another aspect of the invention, there is provided a surface-modifying method comprising the steps of applying to the surface of an article a liquid-repellency treatment solution of a single polymeric compound, dissolved in a solvent, comprising first segments containing fluorine atoms and second segments different from the first segments in terms of affinity for the solvent, an aggregate of the polymeric compound formed by physical crosslink between the first segments; and drying the solution.

In still another aspect of the invention, there is provided a polymeric compound comprising a first segment containing fluorine atoms and a second segment different from the first segment in terms of affinity for solvents, wherein the first segment has a structure selected from the group consisting of general formulas (1) through (4) below, and the second segment has a structure selected from the group consisting of general formulas (5) and (6) and the chemical formulas of compounds <1> through <4> listed below:

first segments:

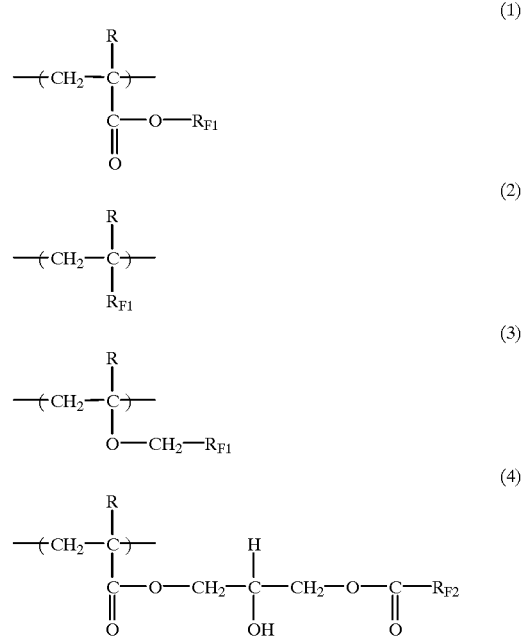

in which in general formulas (1) through (4),

R=H or CH$_3$,
R$_{F1}$=—CF$_2$—(—CF$_2$—)$_{n1}$—CF$_3$,

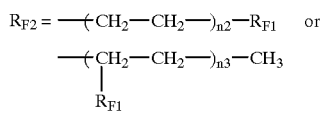

each of n1, n2 and n3 is independently an integer between 1 and 10;
second segments:

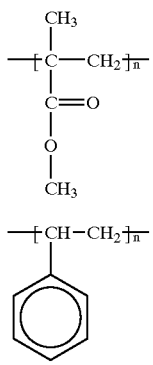

in which n is a positive integer;
<1>: glycidyl(meth)acrylate,
2-glycidyl(meth)acrylate,
allylglycidyl(meth)acrylate,
allyl-2-methylglycidyl(meth)acrylate,

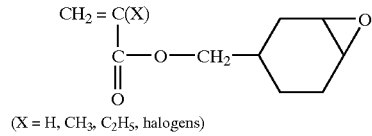

(X = H, CH$_3$, C$_2$H$_5$, halogens)

<2>: vinyltrimethoxy silane,
vinyltriethoxy silane and other vinyl type silane coupling agents,
γ-(meth)acryloxypropyltrimethoxysilane,
γ-(meth)acryloxypropyltriethoxysilane,
<3>: dimethylaminoethyl(meth)acrylate,
dimethylaminopropyl (meth) acrylate,
acrylic acid,
methacrylic acid,
maleic acid,
fumaric acid,
vinyl acetate,
styrene carboxylate,
<4> 2-hydroxymethyl(meth)acrylate,
2-hydroxyethyl(meth)acrylate,
3-chloro, 2-hydroxypropyl(meth)acrylate,
allylphenol.

In still another aspect of the invention, there is provided a method of manufacturing a macro-monomer containing a perfluoroalkyl group having an ethylenically unsaturated group at the terminal thereof, comprising the step of reacting an oligomer containing a perfluoroalkyl group having a carbooxyl group at the terminal thereof with an epoxy compound containing an ethylenically unsaturated group.

In still another aspect of the invention, there is provided a method of manufacturing a graft polymeric compound comprising the step of copolymerizing a macro-monomer containing a perfluoroalkyl group having an ethylenically unsaturated group at the terminal thereof and a monomer containing an aromatic ring having a functional group capable of radical polymerization.

In still another aspect of the invention, there is provided the method of manufacturing a graft polymeric compound according to above paragraph, wherein
the monomer containing an aromatic ring is at least one selected from the group consisting of a phenyl group, a naphthyl group and a heterocyclic group.

In still another aspect of the invention, there is provided a method of manufacturing a macro-monomer containing acromatic rings having an ethylenically unsatrurated group at the terminal thereof comprising the step of reacting an oligomer containing an aromatic ring having a carboxyl group at the terminal thereof with an epoxy compound containing an ethylenically unsaturated group.

In still another aspect of the invention, there is provided a method of manufacturing a graft polymeric compound comprising a step of copolymerizing a macro-monomer containing aromatic rings having an ethylenically unsaturated group at a terminal and a monomer containing perfluoroalkyl group having a functional group capable of radical polymerization.

In still another aspect of the invention, there is provided a method of manufacturing a graft polymeric compound comprising the step of copolymerizing a macro-monomer having an ethylenically unsaturated group at the terminal thereof and an aromatic-ring-containing monomer having a functional group capable of radical polymerization and a perfluoroalkyl group.

In still another aspect of the invention, there is provided a method of manufacturing a crosslinked graft polymeric compound comprising the steps of providing a graft copolymer by copolymerizing a macro-monomer having an ethylenically unsaturated group at the terminal thereof and a crosslinkable functional group in the molecule with a monomer containing a perfluoroalkyl group and a functional group capable of radical polymerization; and crosslinking the functional group of the graft copolymer originating from the macro-monomer.

In still another aspect of the invention, there is provided an ink-jet recording head comprising an ink discharge orifice plane having a plurality of ink discharge orifices arranged thereon, including first regions having a predetermined affinity for water and second regions having an affinity for water different from that of the first region, the first regions and the second regions existing alternately along the peripheries of the ink-jet discharge orifices.

In still another aspect of the invention, there is provided an ink-jet recording head comprising an ink discharge orifice plane having a plurality of ink discharge orifices arranged thereon, having a polymer film provided thereon including polymer chains containing fluorine atoms, and physical aggregates of the polymer chains in the inside and/or on the surface of the polymer film.

In still another aspect of the invention, there is provided an ink-jet recording head comprising an ink discharge orifice plane having a polymer film provided thereon, compoosed of a single polymeric compound having first segments containing fluorine atom and second segments different from the first segments in terms of affinity for solvents, including an aggregate of the polymeric compound in the inside and/or on the surface of the polymer film by physical crosslink between the first segments.

In still another aspect of the invention, there is provided a method of manufacturing a discharge orifice plate to be used for an ink-jet recording head, comprising the steps of: (i) forming on one of the surfaces of a plate member a polymer film which includes a polymer chain containing fluorine atoms, and a physical aggregate of the polymer chain in the inside and/or on the surface thereof, and absorbs light with a predetermined wavelength range; and (ii) irradiating the plate member resulting from the step (i) with light of the wavelength range to be absorbed by the polymer film to produce a through-hole in the plate member.

In still another aspect of the invention, there is provided a method of manufacturing a discharge orifice plate to be used for an ink-jet recording, comprising the steps of: (i) forming on one of the surfaces of a plate member a polymer film which is composed of a single polymeric compound having first segments containing fluorine atoms and second segments different from the first segments in terms of affinity for solvents, includes an aggregate of the polymeric compound in the inside and/or on the surface thereof by physical crosslink between the first segments, and absorbs light with a predetermined wavelength range; and (ii) irradiating the plate member resulting from the step (i) with light of the wavelength range to be absorbed by the polymer film to produce a through-hole in the plate member.

In a further aspect of the invention, there is provided an ink-jet recording head comprising a discharge orifice for discharging ink, ink flow paths communicating with the discharge orifice, a discharge energy generating element arranged in the ink flow path for the purpose of generating energy to be used for discharging ink and a discharge orifice plate jointed to the orifice plane carrying the orifice communicating with the ink flow path, the discharge orifice plate being obtained by the method of manufacturing a discharge orifice plate to be used for an ink-jet recording according to the invention.

DESCRIPTION OF THE PREFERRED EMBODIMENTS

Now, the present invention will be described in greater detail by way of preferred embodiments.

The present invention has been achieved in the course of developing a novel liquid-repelling agent having excellent liquid-repelling properties by studying various application type liquid-repelling agents that can be used in different industrial applications.

<Description of Polymer Film>

An embodiment of a polymer film according to the invention will be described by referring to FIG. 1.

Figure 1:
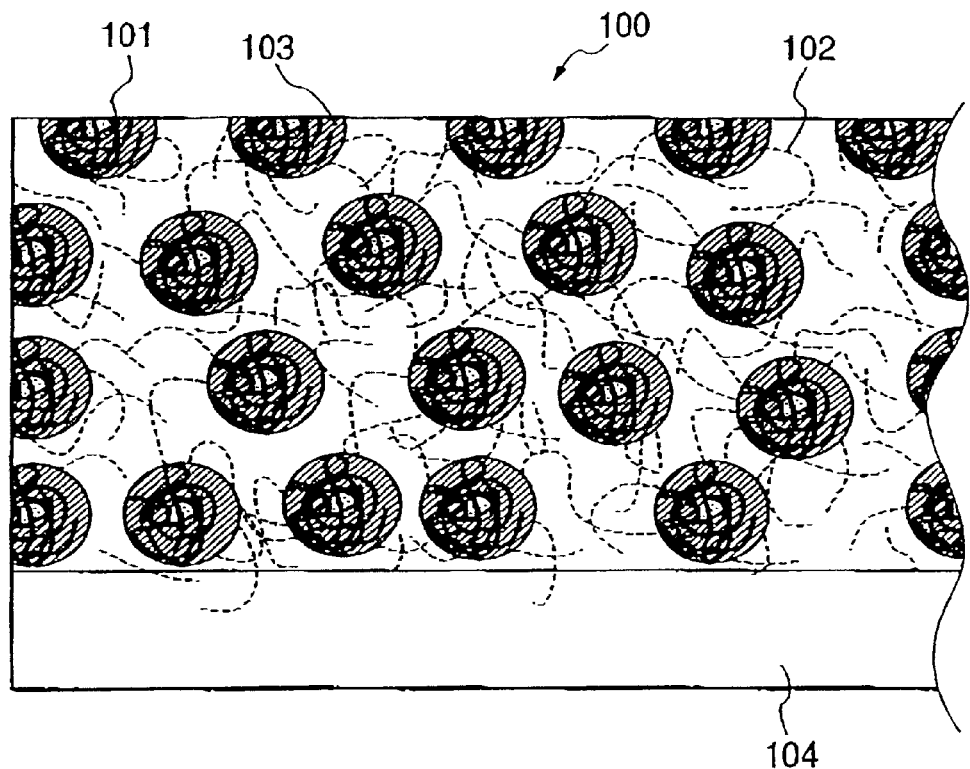
FIG. 1 is a schematic conceptual illustration of a polymer film according to the invention.

FIG. 1 is a schematic conceptual illustration of a polymer film provided on a base material 104 according to the invention. In the illustrated instance, the polymer film is made of a polymeric compound having first segments containing fluorine atoms and second segments different from the first segments in terms of affinity for solvents and includes aggregates of the polymeric compound formed ubiquitously in the inside and an the surface thereof by physical crosslink (aggregation) of the first segments.

More specifically, as shown in FIG. 1, a polymer film 100 is made of a single polymeric compound having first segments 101 containing fluorine atoms and second segments 102 different from the first segments in terms of affinity for solvents, e.g., toluene and methylethyl ketone (MEK) and includes physical aggregates 103 (to be referred to as "domains" hereinafter) of the polymeric compound formed ubiquitously in the inside and the surface of the polymer film. Since the polymer film 100 has domains 103 of the polymeric compound formed by physical crosslink of the first segments on the surface thereof opposite to the one facing the base material 104, domains of aggregates of fluorine atoms are scattered and exposed over the surface. As a result, the surface of the polymer film 100 carries regions of two types that are different from each other in terms of affinity for water and other solvents so that consequently the surface of the polymer film 100 shows excellent liquid repellency. As a result of a series of studies, the inventors have found that the surface of an article to be made liquid-repellent becomes more liquid-repellent when domains of the polymeric compound containing liquid-repellent fluorine atoms exist in such a state that the physical aggregates substantially composed of fluorine atoms are scattered as shown in FIG. 1 than when it is uniformly liquid-repellent. This is because the surface energy fluctuates minutely relative to liquid when the surface carries domains of the liquid-repellent polymeric compound.

As described above, a polymer film made of a single polymeric compound and including the domains formed in the inside and/or on the surface thereof shows a liquid-repelling effect for a prolonged period of time compared with any known resin fllims containing fine particles of fluorine resin in a dispersed and mixed state, since fluorine atoms are introduced as part of the polymeric compound and the domain exists ubiquitously.

<Method of Manufacturing a Polymer Film>

Now, a method of manufacturing a polymer film having the above characteristic properties will be described below.

Such a polymer film can be formed without difficulty by applying onto a base material a solution (liquid-repellency treatment solution) prepared by dissolving into a solvent a polymeric compound having first segments containing fluorine atoms and second segments different from the first segments in terms of affinity for the solvent and evaporating the solvent. The polymeric compound preferably have a structure where either the first segments or the second segments take the role of main chain, while the other takes that of branch to form a graft copolymer. Therefore, for the purpose of the present invention, it may be so arranged that the first segments containing fluorine atoms takes the role of main chain while the second segments takes that of branch or vice versa.

The use of a graft copolymer as the polymeric compound of a polymer film according to the invention is advantageous for forming a liquid-repellent film because the domain structure can be produced efficiently in the solution in a spontaneous way simply by dissolving the graft copolymer into the solvent to be used in order to prepare the solution to be used for application.

Now, the method of manufacturing the polymeric compound for forming a polymer film having a domain structure according to the invention will be described. As pointed out above, it is advantageous to use a graft copolymer as the polymeric compound for the purpose of the invention. In general, a graft copolymer can be synthetically formed through reaction of different polymer segments or polymer segments and a monomer. Normally, it is obtained by polymerizing polymer segments taking the role of the second segments (branches) in the presence of polymer segments taking the role of main chain Specific examples of polymers that can be used for the first segments are listed below.

Examples of monomer ingredients containing fluorine atoms that can be used for the purpose of the present invention include 1H,1H-perfluoro-n-octyl(meth)acrylate; 1H,1H-perfluoro-n-octylmethacrylate; 1H,1H,2H-perfluoro-1-dodecene; 1H,1H,2H-perluoro-1-decene and 1H,1H,2H-perfluoro-1-octene. Examples of polymerizable monomers that can be used for the purpose of the invention include epoxy compounds having an ethylenically unsaturated group such as glycidyl(meth)acrylate, 2-methylglycidyl (meth)acrylate, glycidyl(meth)acrylate, 2-methyl glycidyl (meth)acrylate, allylglycidyl ether and allyl-2-methylglycidyl ether. For the purpose of the present invention, (meth)acrylate refers to both acrylate and methacrylate.

Examples of polymerization initiators that can be used for the purpose of the present invention include 4,4'-azobis-4-cyanovalerianic acid, 2,2'-azobis-2-aminopropane hydrochloride, benzoyl peroxide, azobisisobutyronitrile and borate trifluoride. Examples of crosslinking agents that can be used for the purpose of the present invention include vinyl type silane coupling agents such as vinyltrimethoxy silane, vinyltriethoxy silane, γ-(meth) acryloxypropyltrimethoxysilane and γ-(meth) acrylopropyltriethoxysilane and compounds having an epoxy group such as 2,2-bis(4-glycidyloxyphenyl) hexafluoropropane, perfluorinated novolac multi-functional expoxy resins, bisphenol type fluorinated expoxy resins, bisphenol A type epoxy resins, novolac type epoxy resins and polyisocyanate compounds capable of producing urethane bonding such as diphenylmethanediisocyanate, tolidinediisocyanate, phenylenediisocyanate and naphthylenediisocyanate.

Specific examples of materials that can be used for the second segments include polymerizable monomers such as styrene, (meth)acrylate, allylphenol, allylbenzene, butadiene and propylene.

Examples of crosslinking agents that can be used for forming the second segments include vinyl type silane coupling agents such as vinyltrimethoxysilane, vinyltriethoxysilane, γ-(meth) acryloxypropyltrimethoxysilane and γ-(meth) acryloxypropyltriethoxysilane, compounds having an epoxy group such as 2,2-bis(4-glycidyloxyphenyl) hexafluoropropane, perfluorinated novolac multi-functional expoxy resins, bisphenol type fluorinated expoxy resins, bisphenol A type epoxy resins, novolac type epoxy resins and polyisocyanate compounds capable of producing urethane bonding such as diphenylmethanediisocyanate, tolidinediisocyanate, phenylenediisocyanate and naphthylenediisocyanate.

As a result of a study of the inventors of the present invention, it has been found that graft copolymers that can be used for forming a polymer film according to the invention are preferably those obtained by means of a macro-monomer process of synthetically forming the segments that take the role of branch as macro-monomer in advance and subsequently incorporating them into the segments of the other monomer that take the role of main chain by copylymerization. For the purpose of the present invention, a macro-monomer refers to a compound having a molecular weight of several hundreds to about ten thousands that can be regarded as a monomer having functional groups that are capable of polymerization. By synthetically forming a graft copolymer, using such a macro-monomer, it is possible to obtain a desirable graft copolymer having a definite structure in terms of the length and the number of branches.

Now, a method of manufacturing a graft copolymer that can be obtained by copolymerizing polymer segments that are to operate as a main chain and a macro-monomer containing fluorine atoms and taking the role of branch will be described in detail.

Firstly, the method of manufacturing a macro-monomer containing fluorine atoms will be discussed.

To begin with, a monomer containing fluorine atoms and having an ethylenically unsaturated group at a terminal and an initiator having a carboxyl group at a terminal and also a functional group capable of radical addition polymerization with the ethylenically unsaturated group at an end of said monomer are made to react with each other to produce an oligomer containing carboxyl groups and fluorine atoms.

A chemical reaction based on the scheme as described below may be used in a first mode of the process of manufacturing a graft copolymer.

As shown in the chemical formula below, 1H,1H-perfluoro-n-octylacrylate (formula 1) is used as a polymerizable monomer containing fluorine atoms and having an ethylenically unsaturated group at a terminal and made to react with an initiator having a chemical structure as shown below and containing a carboxyl group at a terminal and also a functional group capable of radical addition polymerization with the ethylenically unsaturated group at an end of said monomer, which is 4,4'-azobis-4-cyanovalerianic acid (formula 2) Then, the 4,4'-azobis-4-cyanovalerianic acid (formula 2) operates as a polymerization initiator, so that the functional group of the monomer (formula 1) positively takes part in radical polymerization to form an oligomer (formula 3) containing carboxyl groups and fluorine atoms.

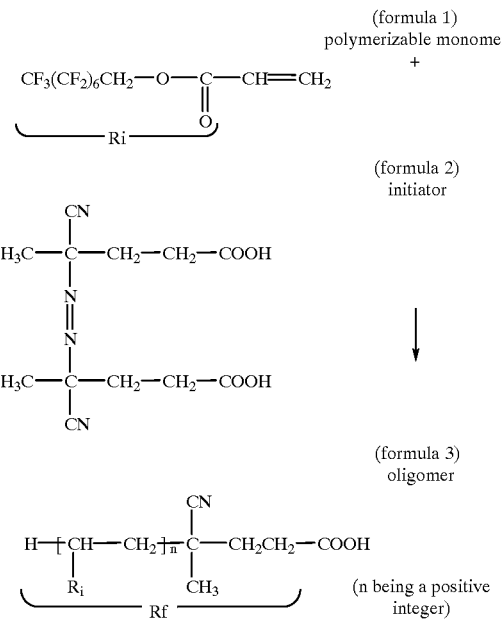

Then, the obtained oligomer containing carboxyl groups and fluorine atoms and an epoxy compound containing an ethylenically unsaturated group are made to react with each other to produce a macro-monomer containing an ethylenically unsaturated group only at a terminal along with fluorine atoms. For the above process, an oligomer containing perfluoroalkyl groups that contains fluorine atoms by more than 10 weight % and has a number-average molecular weight of per chain between 1,000 to 100,000 is preferably used.

A chemical reaction as described below may be used after the above reaction based on the above described scheme as continuation of the mode of the process of manufacturing a graft copolymer. As shown in the chemical formula below, the obtained oligomer containing carboxyl groups and fluorine atoms (formula 3) is made to react with glycidyl-methacrylate (formula 4) that is used as a compound containing an ethylenic unsaturated group. Then, the carboxyl groups of the oligomer (formula 3) react with the epoxy groups of the glycidylmethacrylate (formula 4) to produce a macro-monomer having an ethylenically unsaturated group only at a terminal (formula 5).

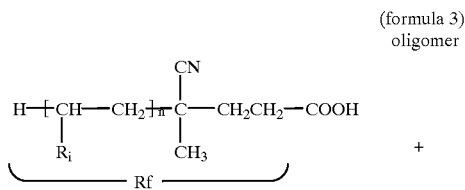

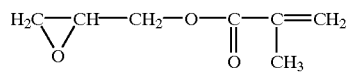

The monomer containing fluorine atoms as expressed by (formula 1) above may be replaced by any of 1H,1H-perfluoro-n-octylmethacrylate, 1H,1H,2H-perfluoro-1-odecene and 1H,1H,2H-perluoro-1-decene and 1H,1H,2H-perfluoro-1-octene. Similarly, the initiator as expressed by (formula 2) above may be replaced by any of 2,2'-azobis-2-aminopropane hydrochloride, benzoyl peroxide, azobisisobutyronitrile and borate trifluoride. Furthermore, the compound containing an epoxy group as expressed by (formula 4) above may be replaced by an epoxy-group-containing compound containing an ethylenically unsaturated group such as 2-methylglycidylmethacrylate, glycidyl acrylate, 2-methylglycidylacrylate, allylglycidyl ether and allyl-2-methylglycidyl ether.

Now, a chemical reaction that can be used for manufacturing a graft copolymer using the macro-monomer (formula 5) obtained in a manner as described above will be discussed below.

A graft copolymer can be formed by copolymerizing the macro-monomer having an ethylenically unsaturated group at a terminal (formula 5) and a monomer having a functional group capable of radical addition polymerization therewith. The reaction of copolymerization can be advantageously accelerated by applying heat to it.

A chemical reaction as described below nay be used after the above reaction based on the above described scheme as continuation of the mode of the process of manufacturing a graft copolymer. The macro-monomer having an ethylenically unsaturated group at a terminal (formula 5) is made to react with a monomer having a functional group capable of reacting with it, which monomer may be methyl methacrylate (formula 6) or ethyl methacrylate (formula 7). Then, the ethylenically unsaturated group at a terminal of the macro-monomer (formula 5) and the functional group of methyl methacrylate (formula 6) or that of ethyl methacrylate (formula 7) are led to radical polymerization to synthetically produce a graft copolymer (formula G1 or G2) as shown below. For the purpose of the invention, methyl methacrylate or ethyl methacrylate may be replaced by some other monomer such as isoborneol(meth)acrylate or dicyclopentadienyl(meth)acrylate.

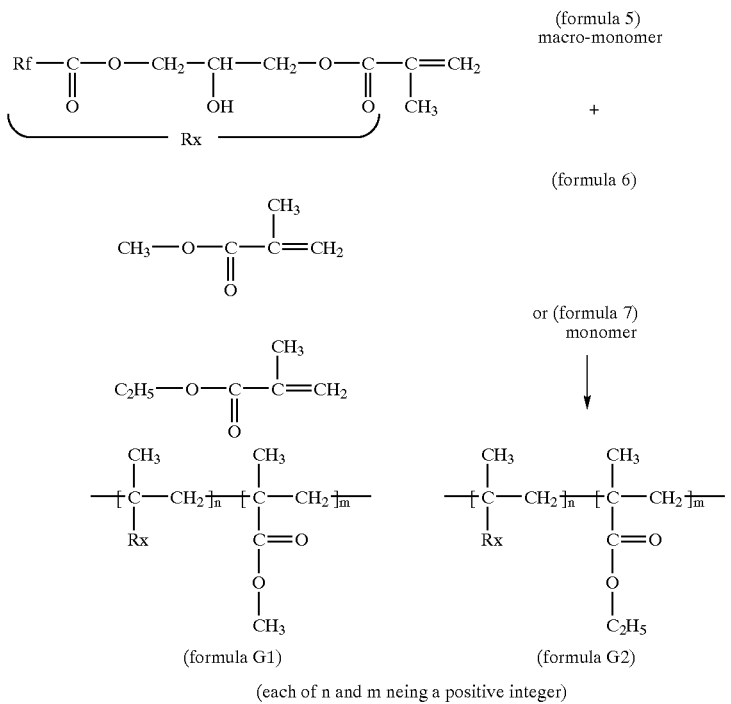

(each of n and m neing a positive integer)

As pointed out above, in a preferable mode of forming a polymer film containing a domain structure according to the invention on the surface of a base material, a macro-monomer is formed by way of the above described process and made to polymerize with a monomer having a functional group capable of radical addition polymerization with an ethylenically unsaturated group of the macro-monomer in a solution in order to produce a solution of graft polymer, which is then applied onto the surface of the base material and dried. Alternatively, the above copolymerization may be made to proceed on the surface of the base material to produce a polymer film containing a domain structure according to the invention there.

While copolymerization using a macro-monomer as described above is not a prerequisite in the process of forming a polymer film for the purpose of the present invention, the synthetic preparation of a macro-monomer in advance for forming a graft copolymer is advantageous because the side chains can be made to have a substantially uniform length so that the obtained graft copolymer operates effectively when it is used for the polymer film.

For the purpose of the present invention, a monomer having a functional group that is capable of radical polymerization and remains after the polymerization with the macro-monomer may be used as a monomer having a functional group capable of radical addition polymerization with the ethylenically unsaturated group of the macro-monomer (formula 5) having an ethylenically unsaturated group. Examples of monomers of this type include vinyl compounds having a hydroxide group, an amino group and/or a carboxyl group. More specifically, any of the monomers <1> through <4> listed below may be used for the purpose of the present invention.

<1>: glycidyl(meth)acrylate,
2-methylglycidyl(meth)acrylate,
allylglycidyl(meth)acrylate,
allyl-2-methylglycidyl(meth)acrylate,

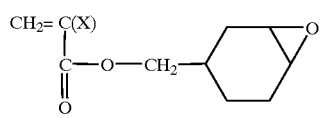

($X = H$, $CH_3$, $C_2H_5$, halogen atom (F, Cl, Br, etc.)), etc.

<2>: vinyltrimethoxy silane,
vinyltriethoxy silane and other vinyl type silane coupling agents,
γ-(meth)acryloxypropyltrimethoxysilane
γ-(meth)acryloxypropyltriethoxysilane, etc.

<3>: dimethylaminoethyl(meth)acrylate,
dimethylaminopropyl(meth)acrylate,
acrylic acid,
methacrylic acid,
maleic acid,
fumaric acid,
vinyl acetate,
styrene carboxylate,
etc.

<4> 2-hydroxymethyl(meth)acrylate,
2-hydroxyethyl(meth)acrylate,
3-chloro-2-hydroxypropyl(meth)acrylate, allylphenol, etc.

In the case of a polymer obtained by using any of the monomers listed in <1> and <2> above, the polymers (the second segments) or the polymer and the surface of the article (second segment and the article surface) can be crosslinked without using any crosslinking agent, although a catalyst such as Lewis acids or amines may be used for the crosslinking.

In the case of a polymer obtained by using any of the monomers listed in <3> and <4> above, a chemically crosslinked structure can be produced among the side chain of the graft copolymer and between the side chain and the base material by adding a vinyl type silane coupling agent or a crosslinking agent as will be discussed below after forming a graft copolymer in a manner as described above. Preferably, the crosslinking agent is added after forming the domain structure of the graft copolymer. More specifically, the crosslinked structure can be formed by applying the crosslinking agent to the article and subsequently irradiating it with UV rays or heating it.

Examples of compounds that can be used as the crosslinking agent include compounds having an epoxy group such as 2,2-bis(4-glycidyloxyphenyl)hexafluoropropane, perfluorinated novolac multi-functional expoxy resins, bisphenol type fluorinated expoxy resins, bisphenol A type epoxy resin, novolac type epoxy resins and polyisocyanate compounds capable of producing urethane bonding such as diphenylmethanediisocyanate, tolidinediisocyanate, phenylenediisocyanate and naphthylenediisocyanate. Specific examples of epoxy compounds that can be used as a crosslinking agent are listed below.

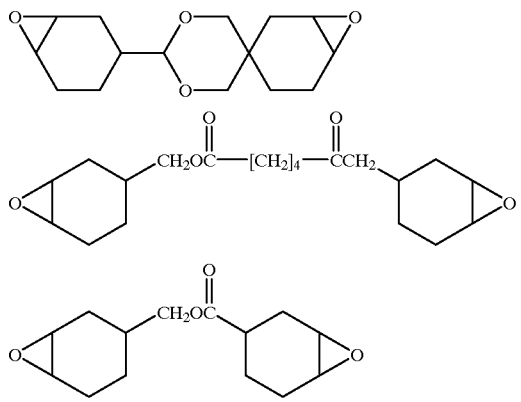

Figure 2:
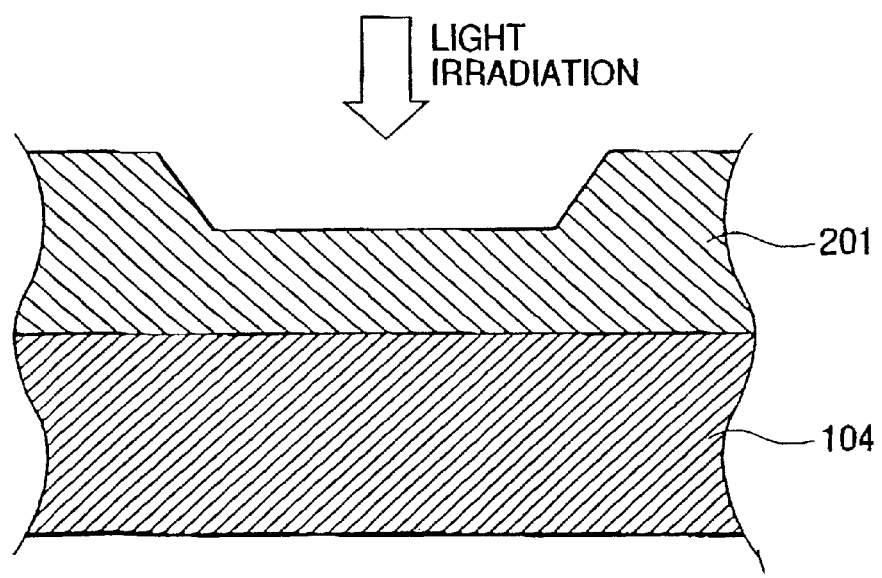
FIG. 2 is a schematic conceptual illustration of a polymer film according to the invention and being processed by energy of light.

In another mode of forming a polymer film according to the invention, aromatic rings and/or double bonds can be introduced into the produced polymer film by adding a compound having an aromatic ring such as styrene and/or a compound having a double bond which remains after graft polymerization such as butadiene. With such an arrangement, the obtained polymer film shows a property of absorbing light so that the polymer film can be processed by using a laser beam. FIG. 2 of the accompanying drawings is a schematic conceptual illustration of a polymer film according to the invention and being processed by energy of light. Since a polymer film 201 provided on the surface of a bare material 104, formed in the above mode of carrying out the invention, absorbs light, it can be processed without difficulty by etching, using light energy typically produced from an excimer laser. Then, as the etched surface of the polymer film 201 also carries scattered domains (not shown) as described above, the remarkable liquid repellency of the surface is maintained.

Examples of compounds that can be used to make a polymer film according to the invention apt to absorb light include allylphenol, allylbenzene, arylvinylmethane, phenyl (meth)acrylate, butadiene, phenoprene and 4-phenyl-1-butane.

While a component for providing the polymer film with a light absorbing property is added to the macro-monomer in the description of the above mode of carrying out the invention, the present invention is by no limited thereto and a similar effect can be obtained by causing the monomer for a main chain to react in advance with a compound that gives the former a light absorbing property.

Now, a second mode of manufacturing a graft copolymer according to the invention will be discussed below. In this mode, a monomer containing an ethylenically unsaturated group and a fluorine, containing molecular chain and a macro-monomer having a functional group capable of crosslinking are copolymerized. Note that, in the case of the graft copolymer of this mode, since the monomer to compose a main chain has a fluorine-containing molecular chain and bonded thereto, the obtained graft copolymer is defined as that containing fluorine atoms in the main chain.

Such a graft polymeric compound can typically be obtained by copolymerization of a macro-monomer having an ethylenically unsaturated group at a terminal and a crosslinkable functional group in the molecule and a monomer containing a perfluoroalkyl group having a functional group capable of radical polymerization.

Firstly, a macro-monomer having an ethylenically unsaturated group at a terminal and a crosslinkable functional group in the molecule is prepared. For instance, Japanese Patent Application Laid-Open No. 62-277408 detailedly describes a method of manufacturing such a macro-monomer. More specifically, such a macro-monomer can be produced by causing a polymer having a hydrophilic group such as a carboxyl group at a terminal to react with an epoxide containing an ethylenically unsaturated group in the presence of a hydrophilic organic solvent. Preferably, the polymer containing a hydrophilic group has at least either a hydroxy group or a methylol group. Additionally, the polymer containing a hydrophilic group has a molecular weight preferably between 500 and 300,000, more preferably between 1,000 and 100,000.

Such a polymer having a hydrophilic group can be obtained by polymerization of a monomer containing an ethylenically unsaturated group having a hydrophilic group such as a hydroxyl group or a methylol group in the presence of a combination of a chain-transfer agent containing a carboxyl group and an initiator or in the presence of an initiator containing a carboxyl group.

Examples of initiators that can be used for the above polymerization include 4,4'-azobis-4-cyanovalerianic acid, 2,2'-azobis-2-aminopropane hydrochloride, potassium peroxide, ammonium peroxide, azobisisobutyronitrile and benzoyl peroxide.

Examples of monomers containing an ethylenically unsaturated group having a hydrophilic group that can be used for the above polymerization include acryl amide, methacryl amide, N-methylolacrylamide, N-methylolmethacrylate, 2-methoxyethylacrylate, 2-methoxyethylmethacrylate, diacetoneacrylamide, hydroxyethylacrylate, hydroxypropylacrylate, hydroxybutylactylate, hydroxyehtylmethacrylate, hydroxypropylmethacrylate, hydroxybutylmethacrylate, acrylates of polyhydric alochols and methacrylates of polyhydric alcohols. Examples of monomers capable of copolymerization that can be used for the above polymerization include acryl amide and its derivatives, derivatives of methacryl amide, derivatives of N-methylolacrylamide, derivatives of N-methylolmethacrylamide, ethylcarbitol acrylate, methyltriglycol acrylate, 2-hydroxyethylacrylatephosphate and propoxyethylacrylate.

A carboxyl group can be reliably introduced to one terminal of the polymer through radical polymerization of the starting material containing as a principle ingredient a monomer containing ethylenically unsaturated group having at least either a hydroxyl group or a methylol group in water and/or an organic solvent in the presence of an initiator containing a carboxyl group if the initiator is used at a rate between 5 and 20 gram-mole per 100 gram-mole of the monomer. Then, the obtained polymer containing a hydrophilic group having a terminal carboxyl group is then made to react with an epoxy compound containing an ethylenically unsaturated group in the presence of a hydrophilic organic solvent to produce a macro-monomer containing a hydrophilic group having a terminal carboxyl group. This reaction is conducted normally a reaction temperature between 80 and 180° C., preferably between 90 and 140° C.

The obtained macro-monomer and a monomer containing a perfluoroalkyl group having a functional group capable of radical polymerization (e.g., 2-(perfluorooctyl)-ethylmethacrylate) are copolymerized in a manner as described above by referring to the first mode of manufacturing a graft copolymer to produce a graft copolymer in the second manufacturing mode. A chemical reaction based on the scheme as described below may be used in the second mode of the process of manufacturing a graft copolymer. For instance, 2-hydroxyehtylacrylate (formula 11) used as an ethylenically unsaturated monomer containing a hydrophilic group for synthetically producing a macro-monomer is made to react with 4,4'-cyanovalerianic acid (formula 2) as an initiator containing a caroboxyl group. Then, an oligomer having the following chemical formula (formula 12) is obtained. A macro-monomer having an ethylenically unsaturated group at a terminal and also a crosslinkable functional group in the molecule is prepared by causing the oligomer to react with glycidylmethacrylate expressed by (formula 4). Subsequently, the oligomer of (formula 13) is copolymerized with a polymerizable monomer containing fluorine atoms and having an ethylenically unsaturated group at a terminal as expressed by (formula 1) to produce a graft copolymer having a main chain with fluorine-containing polymer chains and also having crosslinkable groups at branches as expressed by (formula 14).

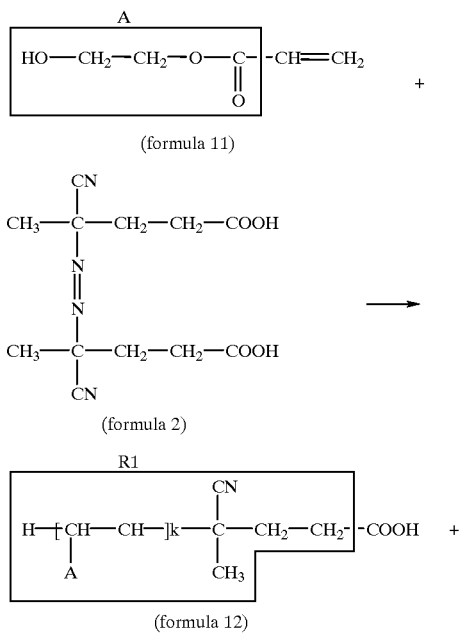

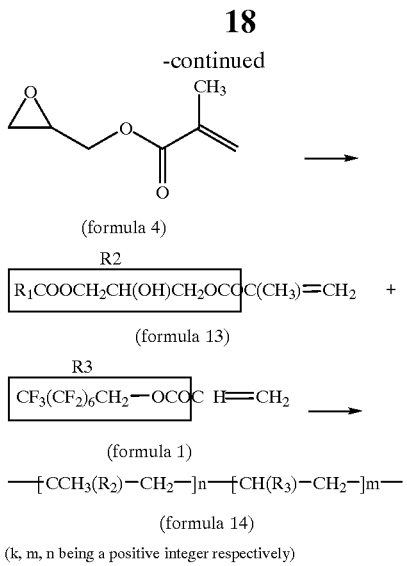

(formula 4)

$R_1COOCH_2CH(OH)CH_2OCOC(CH_3)=CH_2$ +

(formula 13)

$CF_3(CF_2)_6CH_2-OCOCH=CH_2$ (formula 1)

$-[CCH_3(R_2)-CH_2-]n-[CH(R_3)-CH_2-]m-$ (formula 14)

(k, m, n being a positive integer respectively)

The branches of the graft copolymer as expressed by (formula 14) can be mutually crosslinked typically by using 2,4-tolylenediisocyanate as expressed by (formula 15) as a crosslinking agent.

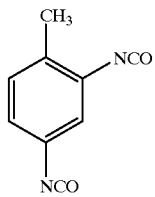

(formula 15)

A polymer film of the graft copolymer formed by the second mode of manufacturing process can also be made to have a light absorbing property by introducing aromatic rings and/or double bonds in a manner as described earlier for the first mode of the process of manufacturing a graft copolymer. More specifically, a compound such as styrene or butadiene may be added during the process of synthetically producing the macro-monomer. Alternatively, aromatic rings and/or double bonds that are held after graft copolymerization may be introduced into the monomer containing perfluoroalkyl groups that is to be copolymerized with the macro-monomer.

In a polymer film according to the invention and prepared in any of the above modes by using a macro-monomer, fluorine-containing polymer chains to be side chains can be uniformly distributed in the film with similar surface energy so that the extent of aggregation of the domains of polymer chains containing fluorine can also be uniformized throughout the polymer film. Thus, the polymer film has uniformly distributed domains of fluorine-containing polymer chains having a uniform extent of fluorine aggregation both on the surface and in the inside, so that, if the light-absorbing surface of the polymer film is partly processed to produce recesses, the entire surface of the recesses maintains the state of containing fluorine like the surface of the polymer film before the processing. Therefore, the polymer film can be used with good condition if it is processed after the formation.

The ink discharge orifice plane of an ink-jet recording head can be made to be highly and durably liquid-repellent by applying a polymer film according to the invention to the ink discharge orifice plane. As pointed out earlier, the ink discharge orifice planes of known ink-jet recording heads are not satisfactory in terms of liquid repellency. To further this discussion, it may be appropriate to quote that polytetrafluoroethylene is known as a liquid-repelling agent that can be applied to the surface of an article in order to make the latter liquid-repellent. When polytetrafluoroethylene is used, it is applied in the form of granules to the surface of the base material of an article and baked at 300° C. to produce a liquid-repelling layer. The inventors of the present invention tried to improve the liquid repellency of a discharge orifice plane by forming a liquid-repelling layer of polytetrafluoroethylene on the discharge orifice plane. However, if the discharge orifice plane is formed by polysulfone that is a popular material for forming discharge orifice planes and whose melting point is lower than 200° C., it cannot withstand the baking temperature of 300° C. for polytetrafluoroethylene. Therefore, it was not possible to form a liquid-repelling layer of polytetrafluoroethylene on the discharge orifice plane.

As a result of a study of the inventors of the present invention under this technical background, they believe that the prior art is not satisfactory for improving the liquid repellency of the discharge orifice plane of an ink-jet recording head and stably maintaining the improved liquid repellency. The present invention is based on this belief.

Now, an ink-jet recording head according to the invention will be described in detail below.

Figure 3:
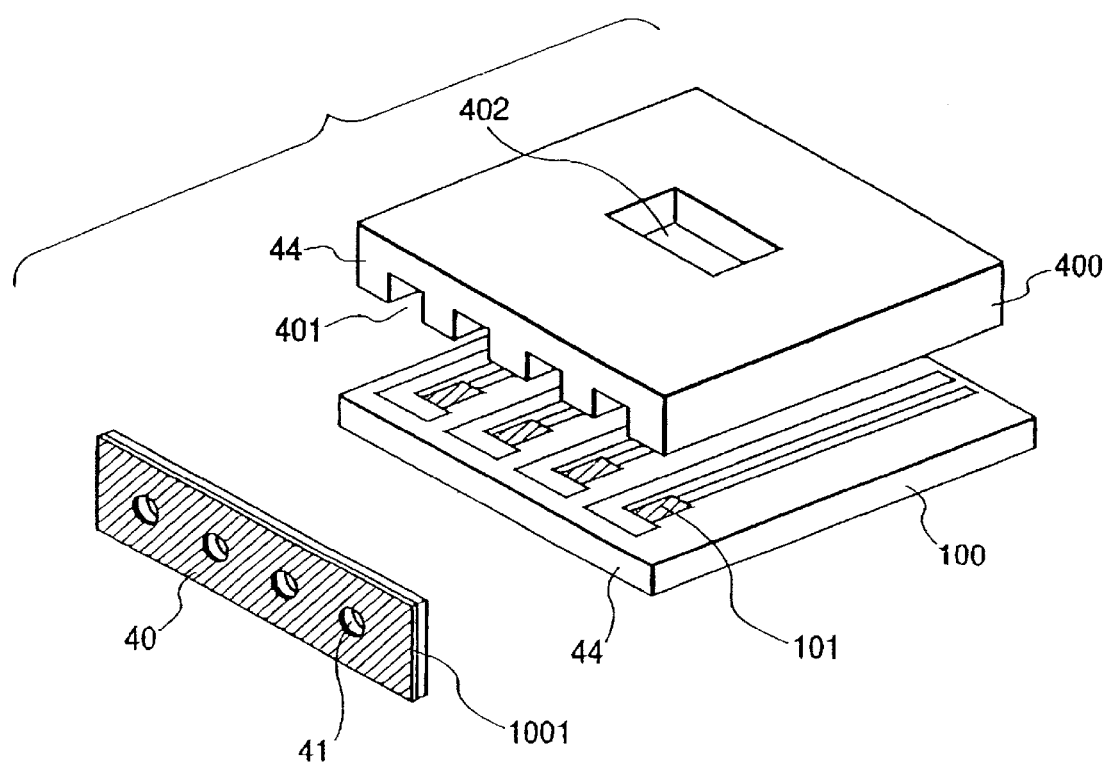
FIG. 3 is an exploded schematic perspective view of an embodiment of a liquid discharge head according to the invention.
Figure 4:
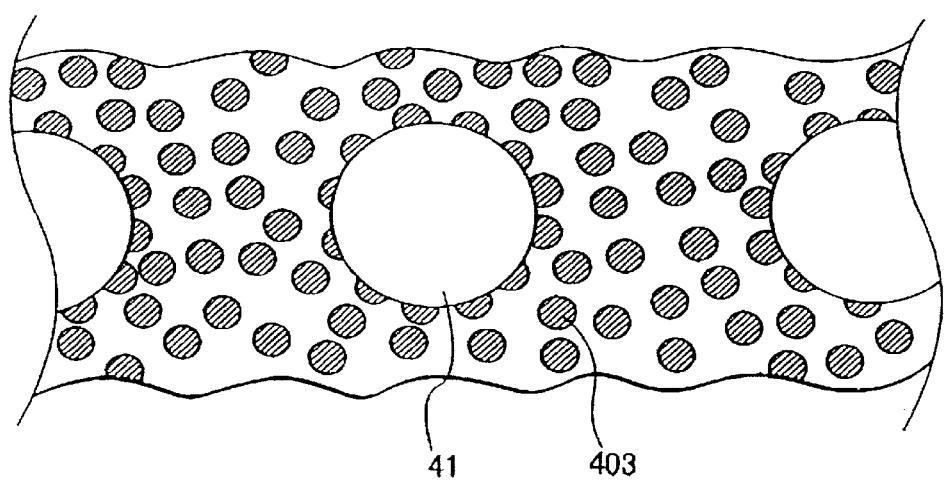
FIG. 4 is a schematic conceptual illustration of a discharge plane carrying discharge orifices of a liquid discharge head according to the invention.
Figure 5:
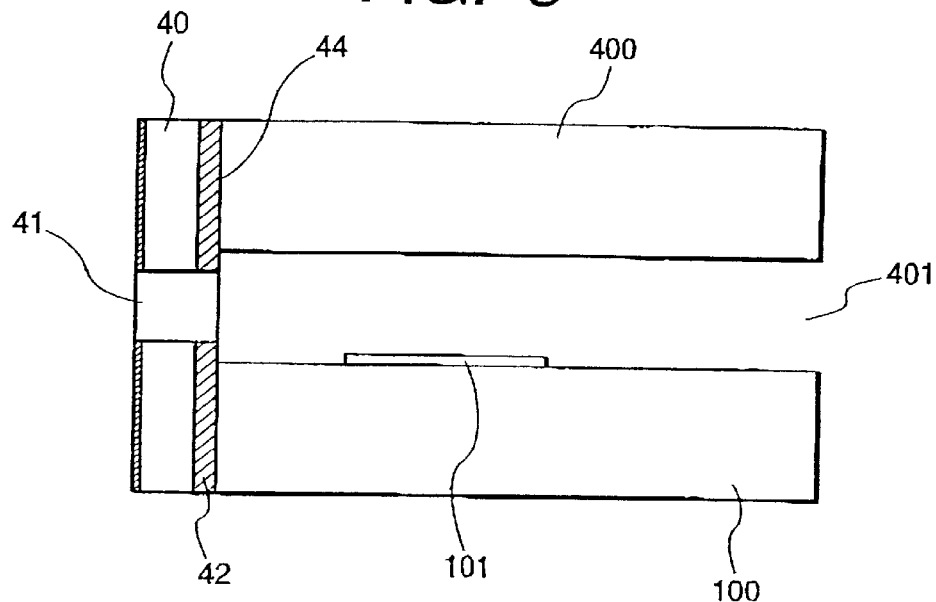
FIG. 5 is a schematic cross sectional view of a discharge plane carrying discharge orifices of a liquid discharge head shown in FIG. 3 according to the invention.

Firstly, the schematic configuration of an ink-jet recording head (which may also be referred to as liquid discharge head hereinafter) according to the invention will be described by referring to the related drawings. FIG. 3 is an exploded schematic perspective view of an embodiment of a liquid discharge head according to the invention. FIG. 5 is a schematic cross sectional view of the discharge plane carrying discharge orifices of the embodiment of the liquid discharge head of FIG. 3 and FIG. 4 is a schematic conceptual illustration of the surface condition of the discharge plane carrying discharge orifices of the embodiment of the liquid discharge head.

As seen from FIGS. 3 and 5, the liquid discharge head of FIGS. 3 through 5 comprises a top plate 400 provided with ink flow paths 401 and a recess defining a liquid chamber 402, energy generating elements (to be referred to as heaters hereinafter) 101 for generating discharge energy and a substrate 100 (to be referred to as heater board hereinafter) that is an Si substrate on which Al wires are formed by means of a film forming process in order to supply the heaters 101 with electric signals. The top plate 400 and the heater board 100 are bonded to produce a head main body having an orifice arrangement plane 44 (to be referred to as the joint surface of the head main body) where orifices 41 of the flow paths 401 are arranged. Then, an orifice plate 40, which will be described hereinafter, is bonded to the Joint surface 44 of the head main body by means of an adhesive 42 to produce a liquid discharge head (see FIGS. 3 and 5).

Preferable materials that can be used for forming the orifice plate 40 includes metal films of SUS and Ni and ink-resistant plastic films of resin materials such as polyimide, polysulfone, polyethersulfone, polyphenyleneoxide, polyphenylenesulfide and polypropylene. Adhesives that can be used for bonding the orifice plate and the head main body for the purpose of the invention include epoxy type adhesives that are moved to the B stage to terminate hardening and shrinking while maintaining the tacking property by irradiation of UV rays and then hardened further when irradiated further by UV rays or heated. Such adhesives can preferably be used for the purpose of the present invention because they readily bond the above components simply by heating them under pressure and hence are highly convenient.

As shown in FIG. 3, the surface condition of the orifice plate 40 with such construction can be obtained by providing on the surface with a polymer film having polymer chains containing fluorine atoms and including physical aggregates 403 of the polymer chains formed in the inside and/or on the surface thereof or providing a polymer film 1001 made of a single polymeric compound comprising first segments containing fluorine atoms and second segments different from the first segments in terms of affinity for solvents, the polymer film including aggregates of the polymeric compound formed in the inside and/or on the surface thereof by physical crosslink (aggregation) of the first segments.

The surface of the orifice plate 40 can be made to have an even more desired surface condition by causing the second segments to have chemical crosslinking among themselves or with the discharge orifice plane of the ink-jet recording.

Additionally, a polymer film adapted to absorb light with a predetermined wavelength range can be formed by causing the second segments to have a phenyl group or a vinyl group that makes a polymeric compound absorb light with a predetermined wavelength range. With such a polymer film arranged on the surface of the base material, through-holes can easily be formed through the polymer film by irradiating it with light of a wavelength that can be absorbed by the polymer film. Then, an orifice plate 40 having excellent surface properties can be manufactured without difficulty. For example, if the wavelength range is found within that of ultraviolet rays, discharge orifices can be formed with ease by using an excimer later to apply light energy to predetermined sites.

<Description of Polymer Film>

Figure 8:
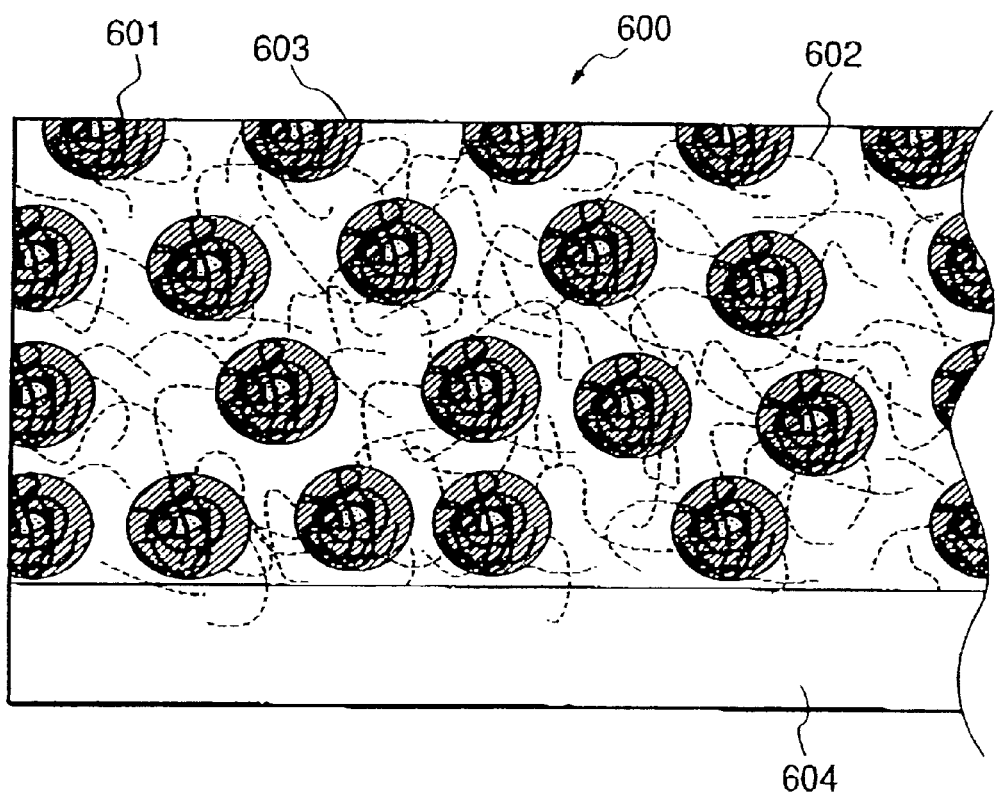
FIG. 8 is a schematic conceptual illustration of a polymer film suitably arranged on the surface of an orifice plate to be used for an ink-jet recording head according to the invention.

Now, a polymer film that can be advantageously arranged on the surface of the orifice place of an ink-jet recording head according to the invention will be discussed below by referring to FIG. 8 that schematically illustrates an embodiment of polymer film according to the invention. FIG. 8 is a schematic conceptual illustration of a polymer fill suitably arranged on the surface of a base material 604 of an orifice plate to be used for an ink-jet recording head according to the invention. In the illustrated embodiment, the polymer film is made of a single polymeric compound comprising first segments containing fluorine atoms and second segments different from the first segments in terms of affinity for solvents and includes aggregates of the polymeric compound formed ubiquitously in the inside and on the surface thereof by physical crosslink aggregation of the first segments.

More specifically, as shown in FIG. 8, the polymer film 600 of the embodiment is made of a single polymeric compound having first segments 601 containing fluorine atoms and second segments 602 different from the first segments in terms of affinity for organic solvents, e.g., toluene and methylethyl ketone (MEK) and includes physical aggregates 603 (to be referred to as "domains" hereinafter) of the polymeric compound formed ubiquitously in the inside and the surface of the polymer film. Since the polymer film 600 has domains 603 of the polymeric compound formed by physical crosslink (aggregation) of the first segments containing fluorine atoms on the surface of the polymer film 600 opposite to the one facing the base material 604, domains of aggregates of fluorine atoms are scattered and exposed over the surface. As a result, the surface of the polymer film 600 carries regions of two types that are different from each other in terms of affinity for water and other solvents so that consequently the surface of the polymer film 600 shows excellent liquid repellency. As a result of a series of studies, the inventors of the present invention have found that the surface of an article to be made liquid-repellent becomes more liquid-repellent when domains of the polymeric compound containing liquid-repellent fluorine atoms exist in such a state that the physical aggregates 403 substantially composed of fluorine atoms are scattered as shown in FIGS. 8 and 4 than when it is uniformly liquid-repellent. This is because the surface energy fluctuates minutely relative to liquid when the surface carries domains of the liquid-repellent polymeric compound. Then, the substantial physical aggregates 403 substantially composed of fluorine atoms that are dispersed around the discharge orifices 402 as shown in FIG. 4 effectively suppress any adhesion of ink to the peripheral areas of the discharge orifices.

As described above, since fluorine atoms are taken into a polymer film made of a single polymeric compound and including domains of the polymeric compound formed in the inside and/or on the surface thereof and domains are found ubiquitously In the polymer film, the polymer film stably shows a liquid-repelling effect for a prolonged period of time compared with any known resin films containing fine particles of fluorine resin in a dispersed and mixed state.

EXAMPLES

Now, the present invention will be described further by way of non-limitative examples. In the following description, the terms "part" and %" are used by weight unless specifically noted otherwise.

Example 1

A solution containing 100 parts of 1H,1H-perfluoro-n-octylmethacrylate (formula 1), 10 parts of 4,4'-azobis-4-cyanovaleriaic acid (formula 2), 500 parts of methylethyl ketone and 500 parts of toluene was made to react at 100° C. for 10 hours under an $N_2$ gas flow to produce an oligomer (formula 3).

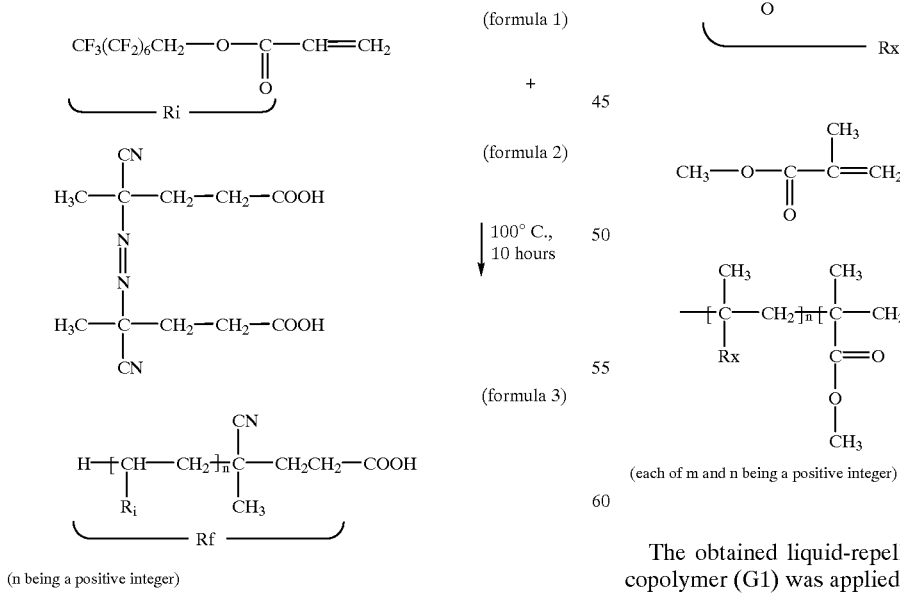

(n being a positive integer)

Methanol was added to the produced oligomer (formula 3) to dissolve any unreacted components and reprecipitate the oligomer. After isolating the oligomer, it was redissolved in toluene to produce a 25% toluene solution of the oligomer. Then, 10 parts of glycidylmethacrylate (formula 4) and 0.05 parts of N, N-dimethyldodecylamine were added to the obtained oligomer solution and made to react with the latter in a manner as expressed by the chemical formulas below at 100° C. for 5 hours to produce a toluene solution (nonvolatile matter: 25%) of a macro-monomer having a terminal vinyl group (formula 5).

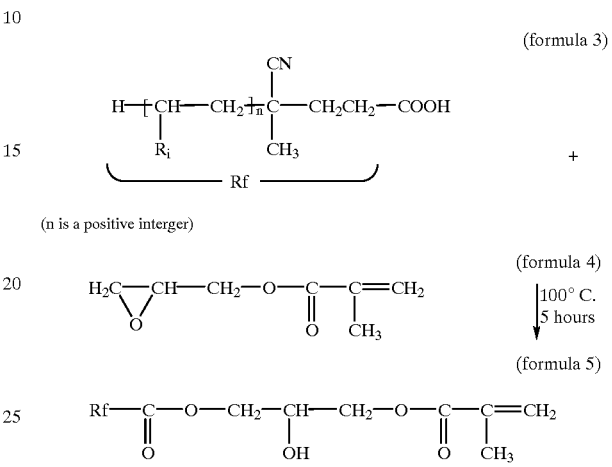

(n is a positive interger)

Subsequently, a solution containing 120 parts of the obtained macro-monomer (formula 5) having a terminal vinyl group (25% toluene solution), 70 parts of methyl methacrylate (formula 6), 0.3 parts of azobisisobutyronitrile and 60 parts of toluene was made to react for polymerization at 100° C. for 12 hours under an $N_2$ gas flow to produce a liquid-repelling agent containing a graft copolymer (G1) in a manner as expressed by chemical formulas below.

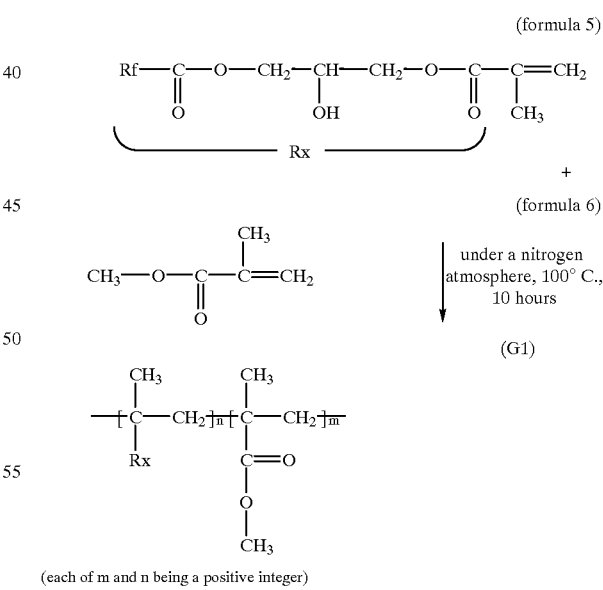

(each of m and n being a positive integer)

The obtained liquid-repelling agent containing the graft copolymer (G1) was applied to the surface of a polysulfone plate to a thickness of 5 μm in a wet state by means of a spinner and dried at 110° C. for 5 minutes on a hot plate to remove the solvent and produce the polymer film of this example.

The obtained polymer film was observed for the static contact angles at room temperature relative to pure water, 10% aqueous solution of oleic acid, 20% aqueous solution of glycerol, 1% aqueous solution of a surfactant (polyoxyethylenenonylphnylether; HLB=10) to find that they were respectively as high as 98°, 86°, 96° and 85° and prove that it was highly liquid-repellent.

Example 2

A toluene solution (nonvolatile matter: 25%) of a macro-monomer having a vinyl group at a terminal (formula 5) was prepared as in Example 1 Then, a solution containing 120 parts of the obtained macro-monomer having a terminal vinyl group (25% toluene solution), 70 parts of styrene (formula 11), 0.3 parts of azobisisobutyronitrile and 60 parts of toluene was made to react for polymerization at 100° C. for 12 hours under an $N_2$ gas flow to produce a liquid-repelling agent containing a graft copolymer (G3) in a manner as expressed by chemical formulas below.

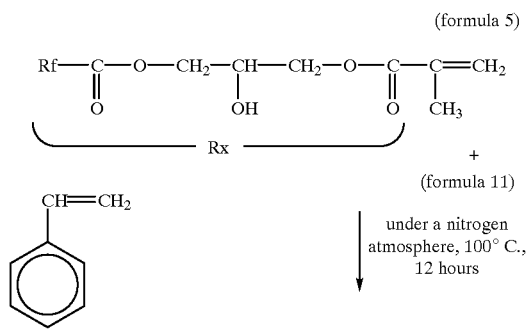

The obtained liquid-repelling agent containing the graft copolymer (G3) was applied to the surface of a polysulfone plate to a thickness of 5 µm in a wet state by means of a spinner and dried at 110° C. for 5 minutes on a hot plate to remove the solvent and produce the polymer film of this example.

The obtained polymer film was observed for the static contact angles at room temperature relative to pure water, 10% aqueous solution of oleic acid, 20% aqueous solution of glycerol, 1% aqueous solution of a surfactant (polyoxyethylenenonylphnylether; HLB=10) to find that they were respectively as high as 102°, 95°, 100° and 88° and prove that it was highly liquid-repellent.

Example 3

A toluene solution (nonvolatile matter: 25%) of a macro-monomer having a vinyl group at a terminal (formula 5) was prepared as in Example 1. Then, a solution containing 120 parts of the obtained macro-monomer having a terminal vinyl group (25% toluene solution), 60 parts of glycidylmethacrylate, 0.3 parts of azobisisobutyronitrile and 60 parts of toluene was made to react for polymerization at 100° C. for 12 hours under an $N_2$ gas flow to produce a liquid-repelling agent containing a graft copolymer.

Then, 1 part of Optomer SP170 (tradename, available from Asahi Denka Kogyo) and 10 parts of 2,2-bis(4-glycidyloxyphenyl)hexafluoropropane (formula 8) expressed by the structural formula below were added to the obtained solution containing the graft copolymer and the mixture was thoroughly stirred to produce a liquid-repelling agent. The obtained liquid-repelling agent was applied to the surface of a polysulfone plate to a thickness of 5 µm in a wet state by means of a spinner and dried at 110° C. for 5 minutes on a hot plate to remove the solvent and produce a film coat. Thereafter, the substrate was irradiated with ultraviolet rays by means of an ultraviolet rays irradiation apparatus comprising a high pressure mercury lamp to an extent of 2 J/cm² for the purpose of crosslinking. Then, the film coat was heated at 100° C. for 5 hours to complete the crosslinking process and obtain the polymer film of this example.

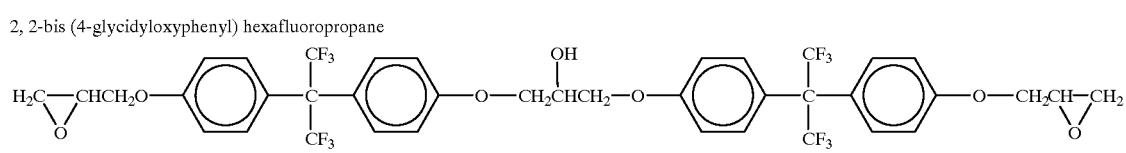

The obtained polymer film of this example was observed for the static contact angles at room temperature relative to pure water, 1% aqueous solution of oleic acid, 20% aqueous solution of glycerol, 1% aqueous solution of a surfactant (polyoxyethylenenonylphnylether; HLB=10) to find that they were respectively as high as 100°, 90°, 93° and 86° and prove that it was highly liquid-repellent. Furthermore, the polymer film of this example was more excellent than that of Example 1 in terns of the adhesion to an article, hardness and abrasion-resistance

Example 4

The process of Example 2 was followed except styrene was replaced by allylphenol for plymerization reaction. Then, 0.1 parts of dibutyltindilaurate and 5 parts of diphenylmethanediisocyante (formula 9) expressed by the structural formula below were added to the obtained solution containing the graft copolymer and the mixture was thoroughly stirred to produce a liquid-repelling agent. The obtained liquid-repelling agent was applied to the surface of a polysulfone plate to a thickness of 5 µm in a wet state by means of a spinner and dried at 110° C. for 5 minutes on a

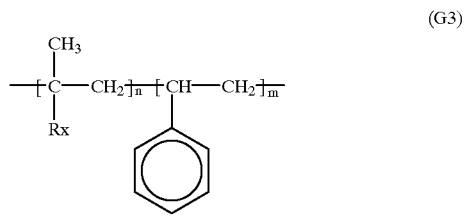

hot plate to remove the solvent and produce a film coat. Then, the film coat was heated at 100° C. for 15 minutes to complete the crosslinking process and obtain the polymer film of this example.

(formula 9)

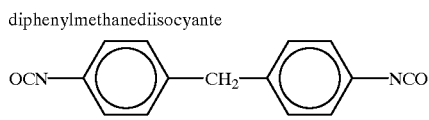

diphenylmethanediisocyante

The obtained polymer film of this example was observed for the static contact angles at room temperature relative to pure water, 10% aqueous solution of oleic acid, 20% aqueous solution of glycerol, it aqueous solution of a surfactant (polyoxyethylenenonylphnylether; HLB=10) to find that they were respectively as high as 96°, 89°, 95° and 85° and prove that it was highly liquid-repellent. Furthermore, the polymer film of this example was more excellent than that of Example 2 in terms of the adhesion to an article, hardness and abrasion-resistance.

Example 5

A toluene solution (nonvolatile matter; 25%) of a macro-monomer having a vinyl group at a terminal (formula 5) was prepared as in Example 1. Then, the process of Example 1 was followed except that a solution containing 120 parts of the obtained macro-monomer having a terminal vinyl group (25% toluene solution), 40 parts of methyl methacrylate (formula 6), 30 parts of γ-methacryloxypropyltrimethoxysilane expressed by the structural formula below (Al74: tradename, available from UCA) (formula 10), 0.3 parts of azobisisobutyronitrile and 60 parts of toluene was made to react for polymerization at 100° C. for 12 hours under an $N_2$ gas flow to produce the polymer film of this example.

(formula 10)

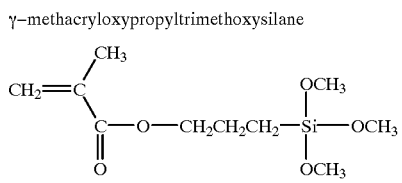

γ-methacryloxypropyltrimethoxysilane

The obtained polymer film of this example was observed for the static contact angles at room temperature relative to pure water, 10% aqueous solution of oleic acid, 20% aqueous solution of glycerol, 1% aqueous solution of a surfactant (polyoxyethylenenonylphnylether; HLB=10) to find that they were respectively as high as 105°, 96°, 90° and 90° and prove that it was highly liquid-repellent Example 6

A solution containing 100 parts of 2-hydroxyehtylacrylate, 10 parts of 4,4'-azobis-4-cyanovalerianic acid and 200 parts of ethyleneglycol-monobutylether was made to react at 100° C. for 10 hours under an $N_2$ gas flow to produce an oligomer.

Methanol was added to the produced oligomer to dissolve any unreacted components and reprecipitate the oligomer. After isolating the oligomer, it was redissolved in toluene to produce a 25% toluene solution of the oligomer. Then, 10 parts of glycidylmethacrylate and 0.05 parts of N,N-dimethyldodecylamine were added to the obtained oligomer solution and made to react with the latter at 100° C. for 5 hours to produce a toluene solution (nonvolatile matter; 25%) of a macro-monomer having a terminal vinyl group.

Subsequently, a solution containing 120 parts of the obtained macro-monomer having a terminal vinyl group (25% toluene solution), 70 parts of 1H,1H-perfluoro-n-octylmethacrylate, 0.3 parts of azobisisobutyronitrile and 60 parts of toluene was made to react for polymerization at 100° C. for 12 hours under an $N_2$ gas flow to produce a liquid-repelling agent containing a graft copolymer.

Then, 0.1 parts of dibutyltinlaurate and 5 parts of tolylenediisocyante were added to the obtained liquid-repelling agent containing the graft copolymer and the solution was stirred thoroughly, applied to the surface of a PSF plate to a thickness of 5 μm in a wet state by means of a spinner and dried at 100° C. for 15 minutes to complete the crosslinking reaction and produce the polymer film of this example.

The obtained polymer film was observed for the static contact angles at room temperature relative to pure water, 10% aqueous solution of oleic acid, 20% aqueous solution of glycerol, 1% aqueous solution of a surfactant (polyoxyethylenenonylphnylether; HLB=10) to find that they were respectively-as high as 92°, 85°, 90° and 88° and prove that it was highly liquid-repellent.

Now, the application of a polymer film according to the invention to an ink-jet recording head and the effects thereof will be discussed also by way of examples.

Example 7

First, a macro-monomer having a terminal vinyl group (a 25% toluene solution) was prepared as follows A solution containing 100 parts of 1H,1H-perfluoro-n-octylacrylate (formula 1), 10 parts of 4, 4'-azobis-4-cyanovalerianic acid (formula 2), 500 parts of methylethyl ketone and 500 parts of toluene was made to react at 100° C. for 10 hours under an $N_2$ gas flow to produce an oligomer (formula 3).

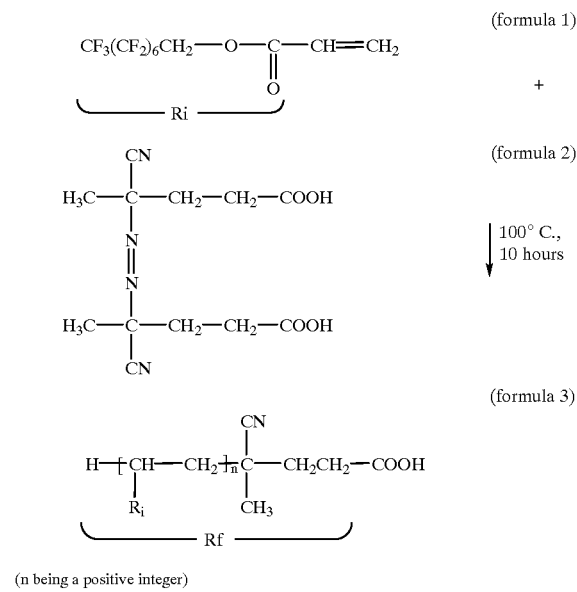

Methanol was added to the produced oligomer (formula 3) to dissolve any unreacted components and reprecipitate the oligomer. After isolating the oligomer, it was redissolved in toluene to produce a 25% toluene solution of the oligomer. Then, 10 parts of glycidylmethacrylate expressed by the (formula 4) above and 0.05 parts of N,N-dimethyldodecylamine were added to the obtained oligomer solution and made to react with the latter at 100° C. for 5 hours to produce a toluene solution (nonvolatile matter: 25%) of a macro-monomer having a terminal vinyl group (formula 5).

Subsequently, a liquid-repelling agent was prepared by using a solution containing 120 parts of the obtained macro-monomer (formula 5) having a terminal vinyl group (25% toluene solution), 70 parts of methyl methacrylate, 0.3 parts of azobisisobutyronitrile and 60 parts of toluene. Then, the above liquid-repelling agent was applied to one side of a 50 $\mu$m thick PSF (polysulfone) film, which is used as an orifice plate, to a film thickness of 0.5 $\mu$m by means of a spin coater. While a spin coater was used in this example, it may be replaced by an ordinary precision application apparatus such as a roll coater, a gravure coater or a spray coater.

Figure 6:
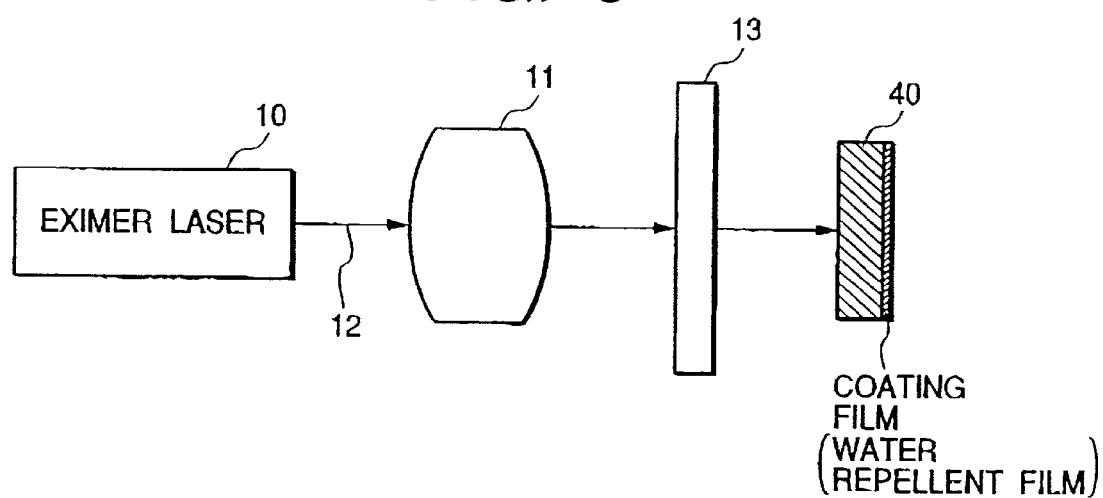
FIG. 6 is a schematic illustration of an apparatus for forming discharge orifices through a discharge orifice plate to be used for an ink-jet recording head according to the invention.
Figure 7:
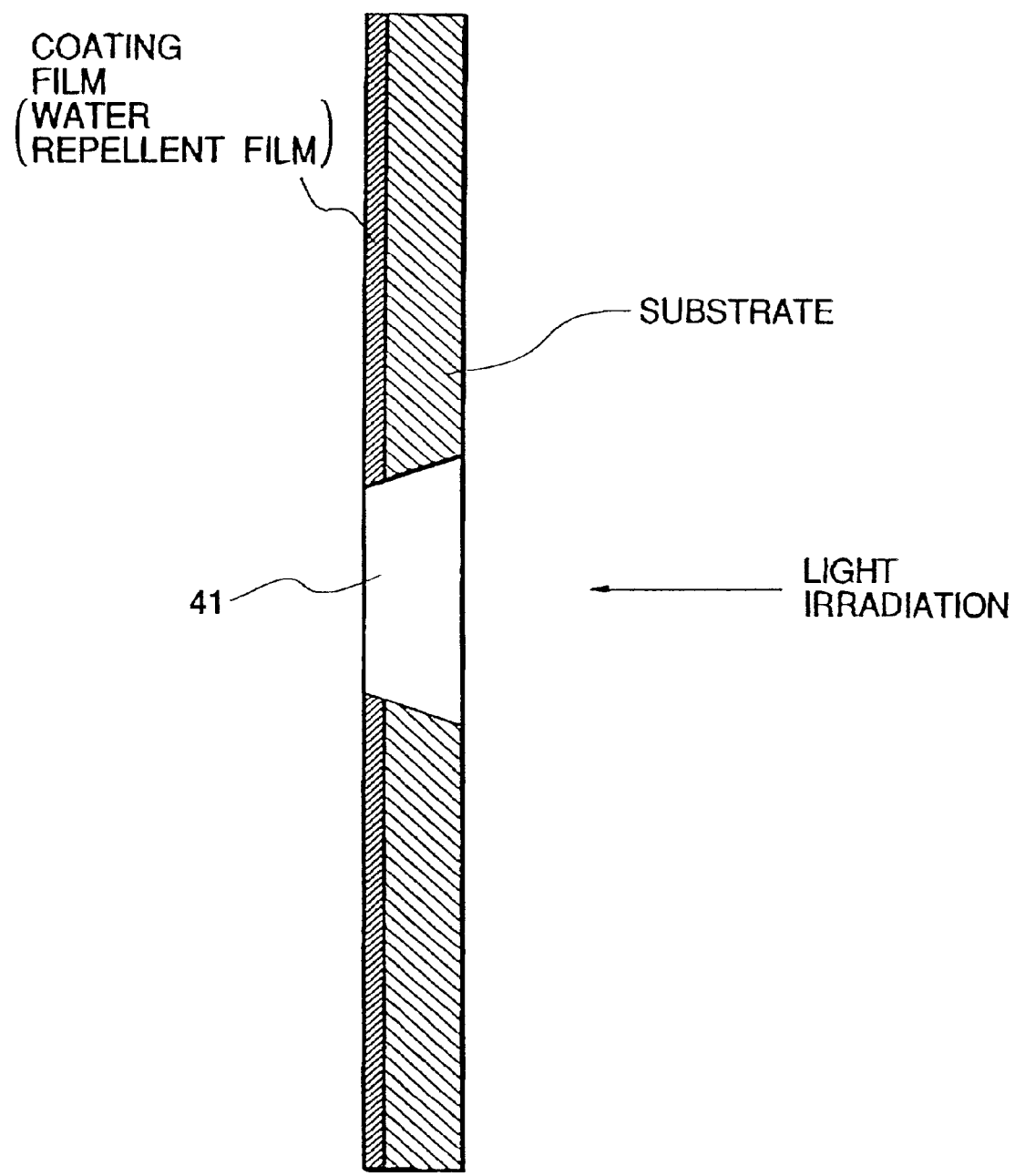
FIG. 7 is a schematic cross sectional view of a discharge orifice plate to be used for an ink-jet recording head according to the invention.

Thereafter, the PSF film carrying a film coat of the liquid-repelling agent on one side was placed in an oven heated to 100° C. for 12 hours to complete the polymerizing reaction. Then, an orifice plate having a plurality of discharge orifices was prepared by processing the obtained PSF film by using a KrF excimer laser with a wavelength of 248 nm and an apparatus as shown in FIG. 6 in such a way that the orifices were arranged linearly at a pitch of 600 dpi. More specifically, referring to FIG. 6, the laser beam of the excimer laser was applied onto the orifice plate 40 at the side not carrying the film coat to produce orifices 41 with a diameter of 20 $\mu$m in the base material as shown in FIG. 7.

On the other hand, an epoxy type adhesive that can be brought into the B stage to terminate hardening and shrinking while maintaining the tacking property by irradiation of UV rays was uniformly applied to the bonding surface 44 of the recording head main body by means of a transfer technique. Thereafter, the adhesive was brought into the B stage by applying ultraviolet rays at a rate of 1 mW/1 cm$^2$ for 60 seconds to terminate the hardening and shrinking of the adhesive.

Then, as shown in FIG. 5, the flow paths 401 of the recording head main body that comprise the bonding surface 44 to which the adhesive 42 had been applied, the flow paths 401, heaters 101, element substrate 100 and top plate 400 were aligned with the orifices 41 of the prepared orifice plate 40. Thereafter, a load was applied to the recording head from the side of the orifice plane in order to firmly bond the orifice plate 40 and the head main body, which were then heated to 60° C. under pressure to terminate the hardening process of the adhesive.

The prepared liquid discharge head of this example was used for printing to find that it operated satisfactorily without slippage and/or uneven printing.

<Other Embodiments>

While the discharge orifices were provided after forming the film coat on the orifice plate in Example 7, the method of manufacturing an ink-jet recording head according to the invention is by no means limited thereto and it may be modified or altered appropriately so long as a liquid-repellent layer is formed on the discharge orifice plane.

Figure 9A:
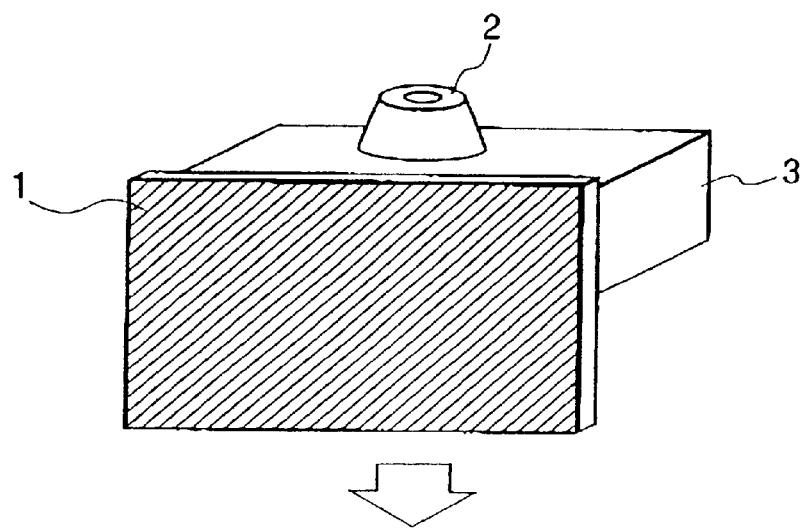
FIGS. 9A and 9B show schematic perspective views of another embodiment of a liquid discharge head according to the invention in different manufacturing step.
Figure 9B:
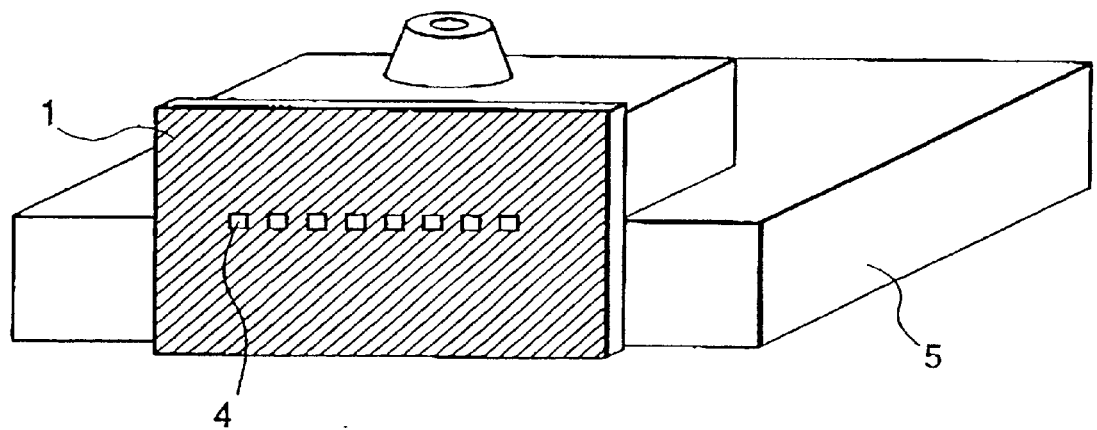

FIGS. 9A and 9B show another processes of preparing a liquid discharge head according to the invention Referring to FIGS. 9A and 9B, liquid-repelling agent similar to the one prepared in Example 1 is applied to the orifice plane of a grooved top plate 3 integrally carrying a liquid chamber, flow paths and a discharge orifice plane and thermally hardened to produce a liquid-repellent layer 1. Thereafter, discharge orifices 4 are formed in the discharge orifice plane by means of an excimer laser as described above by referring to Example 7. The grooved top plate 3 having the discharge orifices is then bonded to a substrate 5 carrying heat emitting elements as means for discharging ink through the discharge orifices to produce a liquid discharge head as shown in FIG. 9B

The prepared liquid discharge head can be used stably for ink-jet recording for a prolonged period of time like the one prepared in Example 7.

Figure 10:
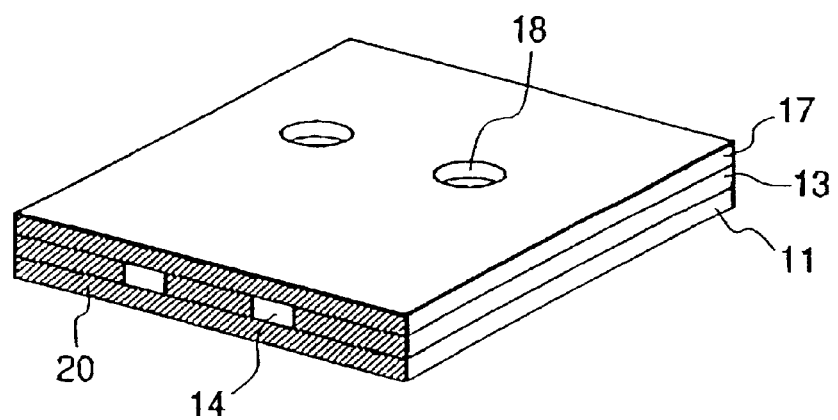
FIG. 10 is a schematic perspective view of still another embodiment of a liquid discharge head according to the invention.

Liquid discharge heads having a structure other than those described above may also be prepared without departing from the scope of the present invention. For example, a liquid discharge head having discharge orifices arranged at the ends of flow paths as shown in FIG. 10 may be possible. Still alternatively, a liquid discharge head of the type where a discharge orifice plate does not have holes at the ends of flow paths with a predetermined diameter (not shown) may also be used stably for ink-jet recording without slippage and/or uneven printing if its discharge orifice plane is treated by a liquid-repelling agent according to the invention.

ADVANTAGES OF THE INVENTION

As described above in detail, according to the present invention, there is provided a novel polymer film that is based on a principle totally different from that of the known liquid-repelling agents used with the known surface-modifying methods and can easily modify the properties of the surface of an article. More specifically, such a polymer film can be formed on the surface of an article by application to improve the liquid repellency of the surface of the article and maintain the liquid-repelling effect.

According to the invention, there are also provided a novel polymeric compound that can be used to form such a polymer film, a liquid-repellency treatment solution containing such a polymeric compound and a method of manufacturing a novel macro-monomer that can be used for synthetically producing such a polymeric compound.

According to the invention, there are also provided a surface-modifying method adapted to provide the surface of an article with a film coat that operates excellently in terms of stable liquid repellency and film formability as well as adhesion to the base material, hardness and abrasion resistance and a surface-modified article.

Additionally, according to the present invention, there are provided an Ink-jet recording head having an excellent discharge orifice plane in terms of liquid repellency (and, preferably, adhesion to the base material of the discharge orifice plane as well as hardness and abrasion resistance) prepared by applying a liquid-repelling agent according to the invention and an ink-jet recording apparatus comprising such an ink-jet recording head. Finally, according to the present invention, there is provided a method of manufacturing a discharge orifice plate to be used for an ink-jet recording head to easily make the latter have a discharge orifice plane provided with a highly liquid-repellent film coat preferably by using light energy typically produced by excimer laser

What is claimed is:

1. An ink-jet recording head comprising an ink discharge orifice plane having a plurality of ink discharge orifices arranged thereon, including first regions having a predetermined affinity for water and second regions having an affinity for water different from that of the first region, said first regions and said second regions existing alternately along the peripheries of the ink-jet discharge orifices.

2. An ink-jet recording head comprising an ink discharge orifice plane having a polymer film provided thereon, composed of a single polymeric compound having first segments containing fluorine atom and second segments different from the first segments in terms of affinity for solvents, including an aggregate of said polymeric compound in the inside and/or on the surface of the polymer film by physical crosslink between said first segments.

3. The ink-jet recording head according to claim 2, wherein
said second segment contains a group for chemically crosslinking with other second segments or with the discharge orifice plane of the ink-jet recording head.

4. The ink-jet recording head according to claim 2, wherein
said second segment contains a group which makes said polymeric compound absorb light with a predetermined wavelength.

5. The ink-jet recording head according to claim 4, wherein
said group is either a phenyl group or a vinyl group.

6. An ink-jet cartridge integrally comprising an ink-jet recording head according to either one of claims 1 and 2 through 5 and an ink tank for supplying ink to said head.

7. An ink-jet recording apparatus comprising an ink-jet cartridge according to claim 6 and a carriage adapted to mount said ink-jet cartridge and operate for scanning.

8. A method of manufacturing a discharge orifice plate to be used for an ink-jet recording, comprising the steps of: (i) forming on one of the surfaces of a plate member a polymer film which is composed of a single polymeric compound having first segments containing fluorine atoms and second segments different from the first segments in terms of affinity for solvents, includes an aggregate of said polymeric compound in the inside and/or on the surface thereof by physical crosslink between said first segments, and absorbs light with a predetermined wavelength range; and (ii) irradiating the plate member resulting from the step (i) with light of the wavelength range to be absorbed by said polymer film to produce a through-hole in said plate member.

9. A method of manufacturing a discharge orifice plate to be used for an ink-jet recording head, comprising the steps of: (i) forming on one of the surfaces of a plate member a polymer film which is composed of a single polymeric compound having first segments containing fluorine atoms and second segments different from the first segments in terms of affinity for solvents, includes an aggregate of said polymeric compound in the inside and/or on the surface thereof by physical crosslink between said first segments, and absorbs light in the ultraviolet wavelength range; and (ii) irradiating the plate member resulting from step (i) with ultraviolet light to produce a through-hole in said plate member.

10. A method of manufacturing a discharge orifice plate to be used for an ink-jet recording head, comprising the steps of: (i) forming on one of the surfaces of a plate member a polymer film which is composed of a single polymeric compound having first segments containing fluorine atoms and second segments different from the first segments in terms of affinity for solvents and containing a group for chemically crosslinking with other second segments or with the discharge orifice plane of the ink-jet recording head, includes an aggregate of said polymeric compound in the inside and/or on the surface thereof by physical crosslink between said first segments, and absorbs light with a predetermined wavelength range; and (ii) irradiating the plate member resulting from step (i) with light of the wavelength range to be absorbed by said polymer film to produce a through-hole in said plate member.

11. An ink-jet recording head comprising a discharge orifice for discharging ink, ink flow paths communicating with the discharge orifice, a discharge energy generating element arranged in the ink flow path for the purpose of generating energy to be used for discharging ink and a discharge orifice plate jointed to the orifice plane carrying said orifice communicating with said ink flow path, said discharge orifice plate being obtained by the method of manufacturing a discharge orifice plate to be used for ink-jet recording according to any one of claims 8 through 10.

12. An ink-jet cartridge integrally comprising an ink-jet recording head according to claim 11, and an ink tank for supplying ink to said head.

13. An ink-jet recording apparatus comprising an ink-jet cartridge according to claim 12 and a carriage adapted to mount said ink-jet cartridge and operate for scanning.

* * * * *

UNITED STATES PATENT AND TRADEMARK OFFICE
CERTIFICATE OF CORRECTION

PATENT NO. : 6,761,431 B2
DATED : July 13, 2004
INVENTOR(S) : Hiromichi Noguchi et al.

It is certified that error appears in the above-identified patent and that said Letters Patent is hereby corrected as shown below:

Column 2,
Line 55, "article," should read -- article. --.

Column 3,
Line 24, "Ink-jet" should read -- ink-jet --.

Column 5,
Line 56, "<4>" should read -- <4>: --.

Column 6,
Line 61, "compoosed" should read -- composed --.

Column 7,
Lines 50 and 57, "cross sectional" should read -- cross-sectional --.

Column 8,
Line 57, "flilms" should read -- films --.

Column 9,
Line 29, "chain" should read -- chain. --.

Column 10,
Line 67, "(formula 2)" should read -- (formula 2). --.

Column 11,
Line 45, "above described" should read -- above-described --.

Column 12,
Line 19, "odecene" should read -- dodecene --.
Line 49, "above described" should read -- above-described --.

Column 13,
Line 29, "neing" should read -- being --.
Line 34, "above described" should read -- above-described --.

UNITED STATES PATENT AND TRADEMARK OFFICE
CERTIFICATE OF CORRECTION

PATENT NO. : 6,761,431 B2
DATED : July 13, 2004
INVENTOR(S) : Hiromichi Noguchi et al.

It is certified that error appears in the above-identified patent and that said Letters Patent is hereby corrected as shown below:

Column 14,
Line 54, "<4>" should read -- >4>: --.

Column 15,
Lines 14 and 15, "expoxy" should read -- epoxy --.

Column 17,
Line 10, "normally" should read -- normally at --.

Column 19,
Line 35, "cross sectional" should read -- cross-sectional --.
Line 54, "Joint" should read--joint--.

Column 20,
Line 33, "later" should read -- laser --.

Column 21,
Line 23, "In" should read -- in --.

Column 23,
Line 12, "Example 1" should read -- Example 1. --.

Column 25,
Line 17, "it" should read -- 1% --.
Line 56, "liquid-repellent" should read -- liquid-repellent. --.

Column 26,
Line 15, "tolylenediisocyante" should read -- tolylenediisocyanate --.
Line 26, "respectively-as" should read -- respectively as --.
Line 34, "follows" should read -- follows. --.

UNITED STATES PATENT AND TRADEMARK OFFICE
CERTIFICATE OF CORRECTION

PATENT NO.     : 6,761,431 B2
DATED          : July 13, 2004
INVENTOR(S)    : Hiromichi Noguchi et al.

It is certified that error appears in the above-identified patent and that said Letters Patent is hereby corrected as shown below:

Column 27,
Line 63, "invention" should read -- invention. --.

Column 28,
Line 8, "9B" should read -- 9B. --.
Line 47, "Ink-jet" should read -- ink-jet --.

Signed and Sealed this

Twenty-third Day of November, 2004

JON W. DUDAS
*Director of the United States Patent and Trademark Office*